(12) United States Patent
Baehr-Jones et al.

(10) Patent No.: US 8,258,476 B1
(45) Date of Patent: Sep. 4, 2012

(54) RADIATION DETECTION USING A NONLINEAR PHASE SHIFT MECHANISM

(75) Inventors: Tom Baehr-Jones, Seattle, WA (US); Michael J. Hochberg, Seattle, WA (US)

(73) Assignee: University of Washington, Seattle, WA (US)

( * ) Notice: Subject to any disclaimer, the term of this patent is extended or adjusted under 35 U.S.C. 154(b) by 92 days.

(21) Appl. No.: 12/626,606

(22) Filed: Nov. 25, 2009

Related U.S. Application Data

(63) Continuation of application No. 12/511,029, filed on Jul. 28, 2009, now abandoned.

(60) Provisional application No. 61/084,370, filed on Jul. 29, 2008, provisional application No. 61/084,378, filed on Jul. 29, 2008, provisional application No. 61/084,473, filed on Jul. 29, 2008.

(51) Int. Cl.
*G01J 5/20* (2006.01)

(52) U.S. Cl. .......................... 250/338.1; 385/2

(58) Field of Classification Search ............... 250/338.4; 385/2
See application file for complete search history.

(56) References Cited

U.S. PATENT DOCUMENTS

| | | | | |
|---|---|---|---|---|
| 3,984,675 | A * | 10/1976 | Corcoran et al. | 359/244 |
| 5,224,196 | A * | 6/1993 | Khanarian et al. | 385/122 |
| 6,819,691 | B2 * | 11/2004 | Fan | 372/20 |
| 7,508,576 | B2 * | 3/2009 | Liu et al. | 359/334 |

* cited by examiner

*Primary Examiner* — David Porta
*Assistant Examiner* — Hugh H Maupin
(74) *Attorney, Agent, or Firm* — Milstein Zhang & Wu LLC; Joseph B. Milstein

(57) ABSTRACT

Radiation detection systems and methods. In one approach, optical radiation can be detected by using the radiation to be detected as input to a high index contrast waveguide modulator that modulates a wavelength of light that falls within the detection band of a detector. In another approach, the optical radiation that is to be detected is combined with a high power CW boost mode signal in a waveguide, and the sum and/or difference frequencies are detected. In either approach, one can use grating couplers to couple the optical radiation of interest into a waveguide.

19 Claims, 21 Drawing Sheets

RADIATION DETECTION USING A NONLINEAR PHASE SHIFT MECHANISM

CROSS-REFERENCE TO RELATED APPLICATIONS

This application is a continuation of U.S. utility patent application Ser. No. 12/511,029, filed on Jul. 28, 2009, and this application claims priority to and the benefit of the earliest effective filing date of that application, which U.S. utility patent application Ser. No. 12/511,029 in turn claims priority to and the benefit of U.S. provisional patent application Ser. No. 61/084,370, filed Jul. 29, 2008, entitled "A Method To Detect Radiation With A Nonlinear Phase Shift Mechanism," and claims priority to and the benefit of U.S. provisional patent application Ser. No. 61/084,378, filed Jul. 29, 2008, entitled "Optical Rectification Detector With Boost Optical Mode Enhancement," and claims priority to and the benefit of U.S. provisional patent application Ser. No. 61/084,473, filed Jul. 29, 2008, entitled "A Method For Enhancing Photodetectors With Grating Couplers," each of which applications is incorporated herein by reference in its entirety. This application is also related to PCT/US2009/33516, and PCT/US2009/36128.

FIELD OF THE INVENTION

The invention relates to systems and methods of optical radiation detection in general and particularly to systems and methods that employ the interaction of light with materials exhibiting large nonlinear coefficients.

BACKGROUND OF THE INVENTION

Optical radiation detection is conventionally performed using semiconductor detectors such as photodiodes and solar cells in which impinging illumination generates electron-hole pairs that are then sensed as electric current and/or electric voltage. Other types of optical radiation detectors include photoresistors and photoconductors that change electrical characteristics under illumination, based on materials such as polyvinylcarbazole and lead sulfide. In addition, one can use charge-coupled devices (CCD) to record images, for example in the field of digital photography.

There is a need for optical or electromagnetic radiation detection systems that have improved bandwidth, improved linearity and improved sensitivity.

SUMMARY OF THE INVENTION

In one aspect, the invention relates to a detector for electromagnetic radiation. The detector comprises a substrate having a surface; a waveguide comprising a material configured to exhibit a nonlinear optical coefficient adjacent the surface of the substrate, the waveguide having an input port configured to receive an optical signal having a first wavelength as an input optical signal, and an optical output port configured to provide a modulated optical signal as an output optical signal, the waveguide further configured to receive electromagnetic radiation to be detected; the waveguide configured to modulate the input optical signal having the first wavelength in response to received electromagnetic radiation to be detected and to provide the modulated optical signal as the output optical signal; and a optical signal detector configured to detect optical signals having the first wavelength, and configured to provide an output indicative of the received electromagnetic radiation to be detected.

In one embodiment, the detector for electromagnetic radiation further comprises a grating coupler for coupling the electromagnetic radiation to be detected to the waveguide. In one embodiment, the waveguide is a slot waveguide. In one embodiment, the substrate having a surface is a silicon-on-insulator wafer. In one embodiment, the waveguide is fabricated in the silicon on the insulator of the silicon-on-insulator wafer.

In one embodiment, the electromagnetic radiation to be detected comprises a selected one of RF, mm wave, infrared and optical radiation. In one embodiment, the output indicative of the received electromagnetic radiation to be detected comprises a selected one of a detection of a presence, a detection of an intensity, and a detection of a frequency of the received electromagnetic radiation to be detected. In one embodiment, the substrate having a surface comprises a selected one of amorphous silicon, a compound having an element in column III of the periodic table, and a compound having an element in column V of the periodic table. In one embodiment, the waveguide is a high index contrast waveguide. In one embodiment, the detector for electromagnetic radiation further comprises a cladding comprising a material that exhibits a nonlinear optical coefficient. In one embodiment, the cladding comprising a material that exhibits a nonlinear optical coefficient is a material exhibiting a $\chi^2$ coefficient. In one embodiment, the detector for electromagnetic radiation further comprises electrodes for poling the material exhibiting a $\chi^2$ coefficient. In one embodiment, the cladding comprising a material that exhibits a nonlinear optical coefficient is a material exhibiting a $\chi^3$ coefficient.

In another aspect, the invention features a method of detecting electromagnetic radiation. The method requires the use of a detector of electromagnetic radiation that comprises a substrate having a surface; a waveguide comprising a material configured to exhibit a nonlinear optical coefficient adjacent the surface of the substrate, the waveguide having an input port configured to receive an optical signal having a first wavelength as an input optical signal, and an optical output port configured to provide a modulated optical signal as an output optical signal, the waveguide further configured to receive electromagnetic radiation to be detected; the waveguide configured to modulate the input optical signal having the first wavelength in response to received electromagnetic radiation to be detected and to provide the modulated optical signal as the output optical signal; and a optical signal detector configured to detect optical signals having the first wavelength, and configured to provide an output indicative of the received electromagnetic radiation to be detected. The method comprises the steps of providing the optical signal having a first wavelength as an input optical signal; illuminating the detector of electromagnetic radiation with electromagnetic radiation of interest to be detected; detecting an output optical signal from the output port of the waveguide with the optical signal detector configured to detect optical signals having the first wavelength; and observing the output of the optical signal detector to receive an output indicative of the electromagnetic radiation to be detected.

In one embodiment, the detector or electromagnetic radiation further comprises a cladding comprising a material that exhibits a nonlinear optical coefficient. In one embodiment, the cladding comprising a material that exhibits a nonlinear optical coefficient is a material exhibiting a $\chi^2$ coefficient. In one embodiment, the detector of electromagnetic radiation further comprises electrodes for poling the material exhibiting a $\chi^2$ coefficient. In one embodiment, the cladding comprising a material that exhibits a nonlinear optical coefficient is a material exhibiting a $\chi^3$ coefficient. In one embodiment, the detector of electromagnetic radiation further comprises a grating coupler for coupling the electromagnetic radiation to be detected to the high index contrast waveguide. In one embodiment, the waveguide is a slot waveguide. In one embodiment, the substrate having a surface is a silicon-on-insulator wafer. In one embodiment, the waveguide is fabricated in the silicon on the insulator of the silicon-on-insulator wafer. In one embodiment, the electromagnetic radiation to be detected comprises a selected one of RF, mm wave, infrared and optical radiation. In one embodiment, the output indicative of the received electromagnetic radiation to be detected comprises a selected one of a detection of a presence, a detection of an intensity, and a detection of a frequency of the received electromagnetic radiation to be detected.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 10C is a diagram that shows a plot of modal patterns over four periods of a segmented waveguide on a horizontal plane that intersects the silicon layer halfway through.

FIG. 22 is a diagram that illustrates one embodiment of an optical rectification based detector based on a silicon on insulator slot waveguide.

DETAILED DESCRIPTION

Figure 1:
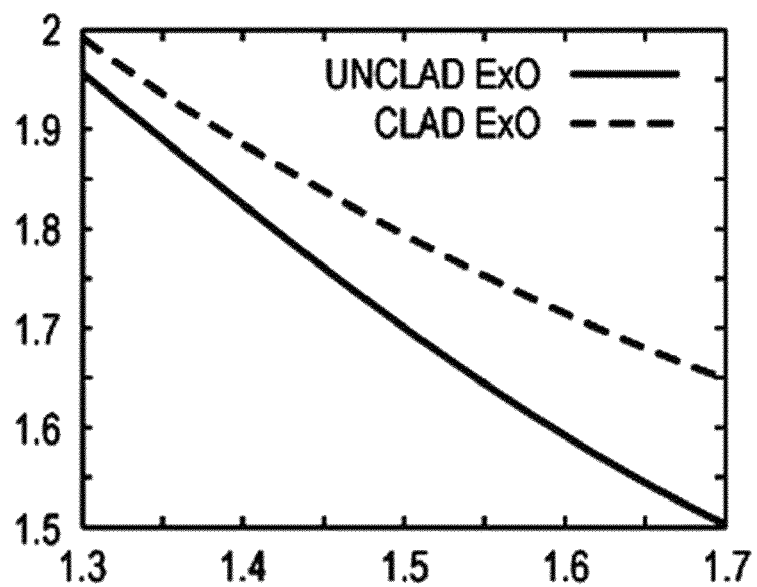
FIG. 1 is a diagram showing dispersion plots for the fundamental mode (Ex polarized) of exemplary clad and unclad waveguides, shown as effective index vs. wavelength in μm.

We now describe high index contrast waveguides that are useful to concentrate light in order to enhance nonlinear optical effects in various materials so that such effects can be employed to manipulate light (or more generally electromagnetic radiation) at low power levels, as compared to conventional systems and methods that employ nonlinear optical materials. The manipulation of electromagnetic radiation or light can be useful to provide a variety of components that perform operations on light such as rectification, modulation, filtering, and logic operations in a manner analogous to the same operations which are provided using electronic devices operating on electrical signals. For example, an input a light wave to be processed is impressed onto the component. The light wave has at least one parameter characterizing the light wave, such as one of an intensity, a polarization, a frequency, a wavelength, and a duration (e.g., a pulse length, or in the case of continuous wave light, an effectively infinite duration). After the input light wave is processed (or interacts with the waveguide and the clad nonlinear optical material adjacent to the waveguide when present), an output signal is observed. In a circumstance where the input signal has been processed, the output signal has at least one parameter that is different from at least one parameter characterizing the input light wave, including possibly an electrical output signal when the input light wave had no electrical signal component (e.g., optical rectification).

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Chi2 ($\chi^2$) and Chi3 ($\chi^3$) based optical effects can be used in particular to build on-chip optical parametric oscillator ("OPO") systems, where two input wavelengths can be mixed together to produce sum and difference frequencies. These frequencies can be either higher or lower than the input frequencies, and can be made tunable. These effects work for frequencies from the ultraviolet and X-ray regime all the way out into the far infrared and microwave, and in fact can work down to DC in some cases, particularly with optical rectification.

The material of which the high index waveguide is made can be any material having a high index that is reasonably transparent at the wavelengths of interest. This can include but is not limited to silicon, gallium nitride, indium phosphide, indium gallium nitride, gallium phosphide, diamond, sapphire, or the various quaternary III/V and II/VI materials such as aluminum gallium arsenide phosphide. III/V denotes materials having at least one element from column III of the periodic table of elements (or an element that is stable as a positive trivalent ion) and at least one element from column V (or an element that is stable as a negative trivalent ion). Examples of III/V compounds include BN, AlP, GaAs and InP. II/VI denotes materials having at least one element from column II of the periodic table of elements (or an element that is stable as a positive divalent ion) and at least one element from column VI (or an element that is stable as a negative divalent ion). Examples of II/VI compounds include MgO, CdS, ZnSe and HgTe.

We present successively the mechanical structure of exemplary embodiments of high index waveguides, exemplary embodiments of cladding materials having large nonlinear constants $\chi^2$ and $\chi^3$ and their incorporation into devices having high index waveguides, and some exemplary results observed on some of the fabricated devices that are described.

Exemplary High Index Waveguide Structures

High-Q Ring Resonators in Thin Silicon-On-Insulator

Resonators comprising high-Q microrings were fabricated from thin silicon-on-insulator (SOI) layers. Measured Q values of 45,000 were observed in these rings, which were then improved to 57,000 by adding a PMMA cladding. Various waveguide designs were calculated, and the waveguide losses were analyzed.

Microring resonator structures as laser sources and as optical filter elements for dense wavelength division multiplexing systems have been studied in the past. The silicon-on-insulator (SOI) structure described here is particularly advantageous. It has low waveguide loss. One can extrapolate an uncoupled Q value of 94,000 and a waveguide loss of 7.1 dB/cm in the unclad case, and −6.6 dB/cm in the PMMA clad case, from the respective measured Q values of 45,000 and 57,000. Although higher Q values have been obtained for optical microcavities, we believe that our geometry has the highest Q for a resonator based on a single mode silicon waveguide. It is also noteworthy that a large amount of power appears outside the core silicon waveguide, which may be important in some applications. The modes that are described herein have approximately 57% of the power outside the waveguide, as compared to 20% for a single-mode 200-nm-thick silicon waveguide, and 10% for a single-mode 300-nm-thick silicon waveguide.

In one embodiment, wafer geometries were selected that minimize the thickness of the SOI waveguiding layer as well as the buried oxide, but still yield low loss waveguides and bends. A number of different waveguide widths were compared by finite difference based mode solving. The geometry used in the exemplary embodiment comprises a 500-nm-wide waveguide formed in a 120-nm-thick silicon layer, atop a 1.4 µm oxide layer, which rests on a silicon handle, such as a silicon wafer as a substrate. Such a configuration supports only a single well-contained optical mode for near infrared wavelengths. The dispersion characteristics are shown in FIG. 1 for both unclad and PMMA-clad waveguides. Our interest in unclad structures stems from the ease of fabrication, as detailed in the following, as well as the flexibility an open air waveguide may provide for certain applications.

These modes were determined by using a finite difference based Hermitian eigensolver. It is possible to calculate the loss directly from the mode pattern with an analytic method valid in the low-loss limit. The waveguide loss at 1.55 µm calculated in such a fashion is approximately −4.5 dB. This loss figure was in agreement with the extrapolated results of FDTD simulation.

Because a loss of −4 dB/cm is attributed to substrate leakage, the waveguide loss can be improved by the addition of a cladding, which tends to pull the mode upwards. This notion is supported by the measured decrease in waveguide loss upon the addition of a PMMA cladding. It can be shown that the substrate leakage loss attenuation coefficient is nearly proportional to $$e^{-2\sqrt{n_{eff}^2 - n_0^2}\, k_0 A}$$

if $k_o$ is the free space wave number, $n_{eff}$ is the effective index of the mode, $n_o$ is the effective index of the oxide layer, and A is the thickness of the oxide. In the present case, the e-folding depth of the above-mentioned function turns out to be 180 nm, which explains why the substrate leakage is so high.

SOI material with a top silicon layer of approximately 120 nm and 1.4 μm bottom oxide was obtained in the form of 200 mm wafers, which were manually cleaved, and dehydrated for 5 min at 180° C. The wafers were then cleaned with a spin/rinse process in acetone and isopropanol, and air dried. HSQ electron beam resist from Dow Corning Corporation was spin coated at 1000 rpm and baked for 4 min at 180° C. The coated samples were exposed with a Leica EBPG-5000+ electron beam writer at 100 kV. The devices were exposed at a dose of 4000 μc/cm², and the samples were developed in MIF-300 TMAH developer and rinsed with water and isopropanol. The patterned SOI devices were subsequently etched by using an Oxford Plasmalab 100 ICP-RIE within 12 mTorr of chlorine, with 800 W of ICP power and 50 W of forward power applied for 33 s. Microfabricated devices such as the one shown in FIG. 2 were tested by mounting the dies onto an optical stage system with a single-mode optical fiber array. A tunable laser was used first to align each device, and then swept in order to determine the frequency domain behavior of each of the devices. Light was coupled into the waveguides from a fiber mode by the use of grating couplers. Subsequently the devices were spin-coated with 11% 950 K PMMA in Anisole, at 2000 rpm, baked for 20 min at 180° C., and retested.

The theoretical development of the expected behavior of a ring resonator system has been described in the technical literature. In the present case the dispersion of the waveguide compels the addition of a dispersive term to the peak width. We take $\lambda_0$ to be the free space wavelength of a resonance frequency of the system, $n_0$ to be the index of refraction at this wavelength, $(\delta n/\delta\lambda)_0$, the derivative of n with respect to $\lambda$ taken at $\lambda_0$, L to be the optical path length around the ring, a to be the optical amplitude attenuation factor due to loss in a single trip around the ring, and finally t to be the optical amplitude attenuation factor due to traveling past the coupling region. In the limit of a high Q, and thus $(1-\alpha) \ll 1$ and $(1-t) \ll 1$, we have $$Q = (\pi L/\lambda_0)[n_0 - \lambda_0(\delta n/\delta\lambda)_0]/(1-\alpha t) \quad (1)$$

Figure 2:
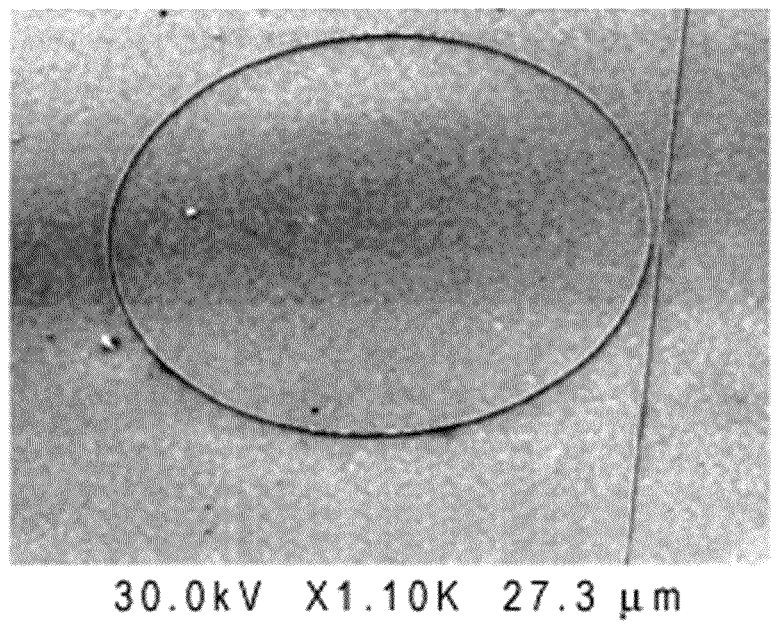
FIG. 2 is a diagram showing an SEM image of an exemplary ring resonator.
Figure 3:
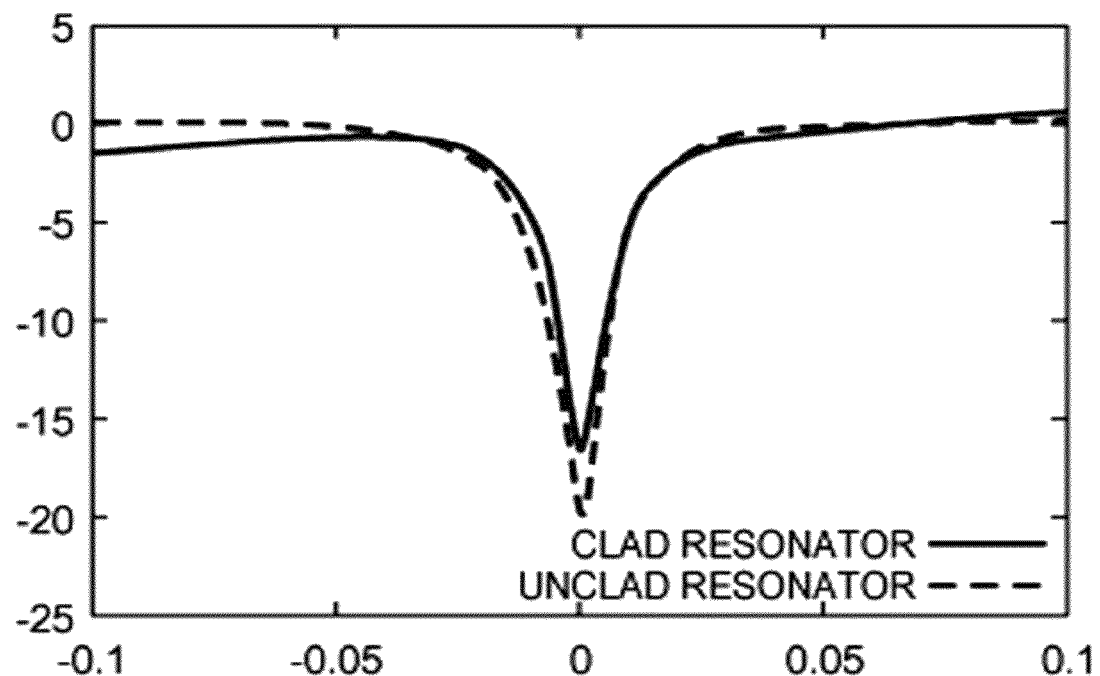
FIG. 3 is a diagram showing the normalized transmission of light through the system (and past the ring) in dB, as a function of wavelength detuning in nm for both clad and unclad waveguides, shifted to overlay resonance peaks.

The waveguide mode was coupled into a ring resonator from an adjacent waveguide. As shown in FIG. 2, the adjacent waveguide can in some embodiments be a linear waveguide. The strength of coupling can then be lithographically controlled by adjusting the distance between the waveguide and the ring. This ring was fabricated with a radius of 30 μm, a waveguide width of 500 nm, and a separation between ring and waveguide of 330 nm. For the clad ring presented, the measured Q is 45,000, and the extinction ratio is −22 dB, for the resonance peak at 1512.56 nm. The PMMA clad ring had a similar geometry, and achieved a Q of 57,000, but with an extinction ratio of −15.5 dB. Typical observed transmission spectra are shown in FIG. 3. The typical amount of optical power in the waveguide directly coupling into the resonator was about 0.03 mW. A dependence of the spectrum on this power was not observed, to within an order of magnitude.

From the mode-solving results for the unclad waveguides, we have $(\delta n/\delta\lambda)(1.512) = -1.182$ μm$^{-1}$, and $n(\lambda=1.512) = 1.688$. Using this result and the earlier relations, the waveguide loss can be calculated from the measured Q value. Specifically, an extinction that is at least −22 dB indicates that a critically coupled Q in this geometry is greater than 38,500, which then implies a waveguide loss of less than −7.1 dB/cm. In similar fashion, the PMMA clad waveguide resonator with a Q of 57,000 but only −15.5 dB of extinction allows a worst case waveguide loss of −6.6 dB/cm. This also implies an intrinsic Q of 77,000 for the unclad resonator, and an intrinsic Q of 94,000 for the PMMA clad resonator.

These devices have a slight temperature dependence. Specifically, the resonance peak shifts correspondingly with the change in the refractive index of silicon with temperature, moving over 2 nm as temperature shifts from 18 to 65° C. The Q rises with higher temperatures slightly, from 33 k at 18° C. to 37 k on one device studied. This shift can probably be explained entirely by the dependence of Q on the effective index.

High-Q Optical Resonators in Silicon-On-Insulator Based Slot Waveguides

We now describe the design, fabrication and characterization of high Q oval resonators based on slot waveguide geometries in thin silicon on insulator material. Optical quality factors of up to 27,000 were measured in such filters, and we estimate losses of −10 dB/cm in the slotted waveguides on the basis of our resonator measurements. Such waveguides enable the concentration of light to very high optical fields within nano-scale dimensions, and show promise for the confinement of light in low-index material with potential applications for optical modulation, nonlinear optics and optical sensing. As will be appreciated, the precise geometry of a resonator (or other kinds of devices) is frequently a matter of design, and the geometry can be varied based on such considerations as length of waveguide, area of a chip, and required interaction (or required non-interaction), such as coupling (or avoiding coupling) with other waveguide structures that are present in a device or on a chip. In some embodiments, the waveguide can be a closed loop, such as at least one ring or at least one oval shaped endless stripe. As has been explained, optical energy can be provided to such a closed loop, for example with an input waveguide.

One can form high quality factor ring or oval resonators in SOI. In these SOI waveguides, vertical confinement of light is obtained from the index contrast between the silicon core and the low index cladding (or air) and the buried silicon dioxide layer, whereas lateral confinement can be obtained by lithographically patterning the silicon. The majority of the light tends to be guided within the silicon core in such waveguide. Although the high refractive index contrast between silicon and its oxide provide excellent optical confinement, guiding within the silicon core can be problematic for some applications. In particular, at very high optical intensities, two-photon absorption in the silicon may lead to high optical losses. Moreover, it is often desirable to maximize the field intensity overlap between the optical waveguide mode and a lower index cladding material when that cladding is optically active and provides electro-optic modulation or chemical sensing.

One solution to these problems involves using a slot waveguide geometry. In a slot waveguide, two silicon stripes are formed by etching an SOI slab, and are separated by a small distance. In one embodiment, the separation is approximately 60 nm. The optical mode in such a structure tends to propagate mainly within the center of the waveguide. In the case of primarily horizontal polarization, the discontinuity condition at the cladding-silicon interface leads to a large concentration of the optical field in the slot or trench between the two stripes. One can predict that the electric field intensity would be approximately $10^8 \sqrt{P}$ V/m where P is the input power in watts. One design uses a 120 nm silicon on insulator layer and 300 nm wide silicon strips on top of a 1.4 μm thick buried oxide layer, which is in turn deposited on a silicon substrate. Various widths for the central slot were fabricated to provide test devices with 50, 60 and 70 nm gaps. Slots larger than 70 nm have also been fabricated and were shown to work well.

In the 1.4-1.6 μm wavelength regime, the waveguide geometry is single mode, and a well-contained optical mode is supported between the two silicon waveguide slabs. There is some loss that such an optical mode will experience even in the absence of any scattering loss or material absorption due to leakage of light into the silicon substrate. The substrate loss can be estimated semi-analytically via perturbation theory, and ranges from approximately −0.15 dB/cm at 1.49 μm to about −0.6 dB/cm at 1.55 μm for the SOI wafer geometry of the present embodiment.

Figure 4:
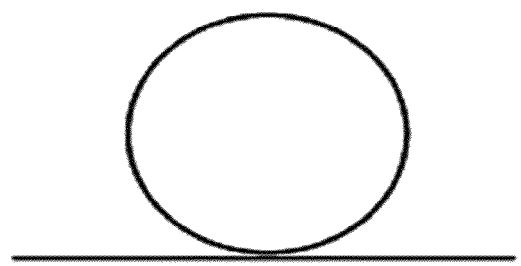
FIG. 4 is a diagram showing the device layout of an exemplary slot waveguide.

Oval resonators were fabricated by patterning the slot waveguides into an oval shape. An oval resonator geometry was selected in preference to the more conventional circular shape to enable a longer coupling distance between the oval and the external coupling waveguide or input waveguide. See FIG. 4. Slots were introduced into both the oval and external coupling waveguides.

Predicting coupling strength and waveguide losses for such devices is not easy. Many different coupling lengths and ring to input waveguide separations were fabricated and tested. It is well known that the most distinct resonance behavior would be observed for critically coupled resonators, in which the coupling strength roughly matches the round trip loss in the ring.

An analytic expression for the quality factor of a ring resonator was presented in equation (1) hereinabove.

Also, the free spectral range can be calculated via:

$$\Delta\lambda = (\lambda_0/L)/[1/L + n_0/\lambda_0 - (\delta n/\delta\lambda)_0] \quad (2)$$

Here, L is the round trip length in the ring, and $n_o$ and $\lambda_0$ are the index of refraction, and the wavelength at resonance, respectively. The derivative of the effective index with respect to the wavelength at the resonance peak is given by $(\delta n/\delta\lambda)_0$, and it can be shown that this term is roughly equal to −0.6 μm$^{-1}$ from the 1.4-1.6 μm spectral range for the slot waveguides studied here.

Figure 5:
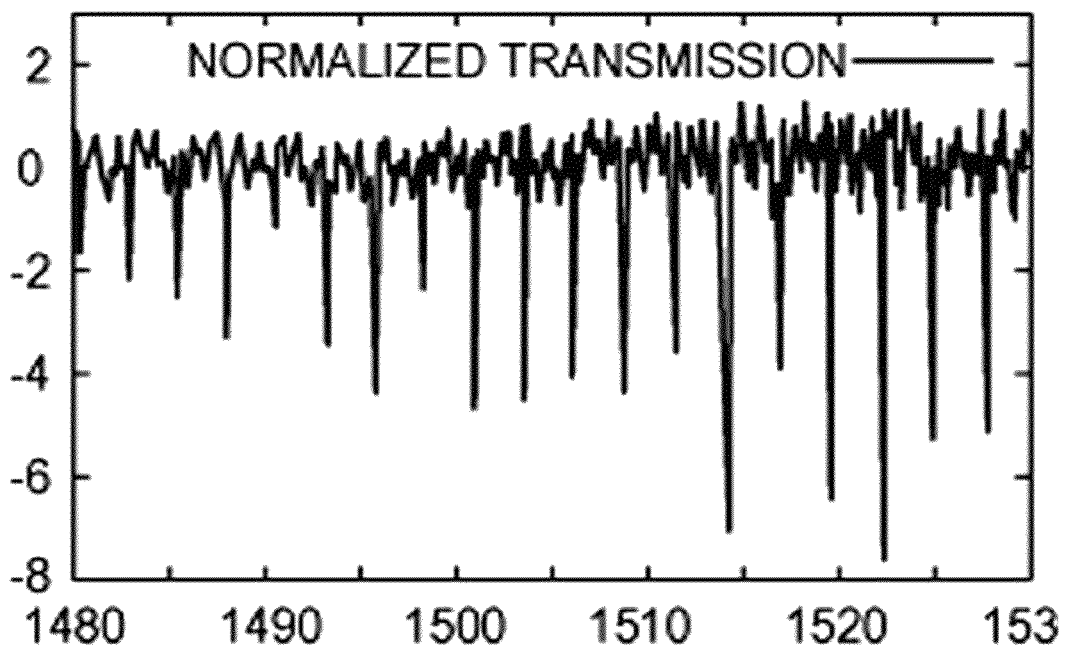
FIG. 5 is a diagram showing the measured transmission spectrum in dB vs. laser wavelength in nm past a high quality factor slot ring resonator.
Figure 6:
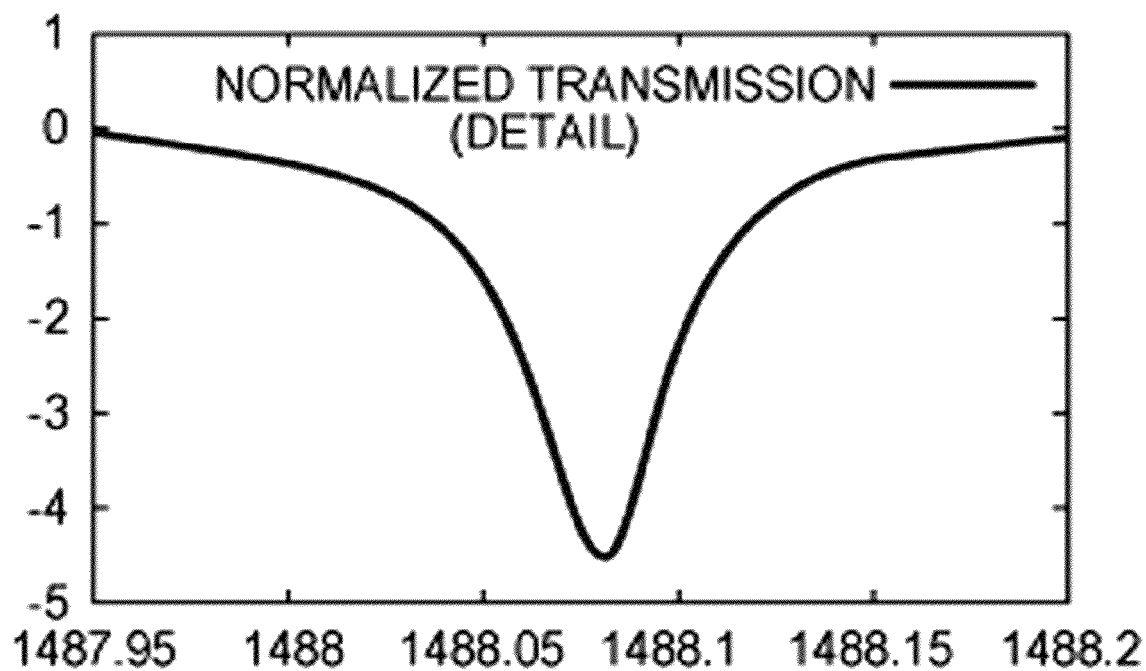
FIG. 6 is a diagram showing the detail of the peak of the transmission spectrum near 1488 nm.

We have observed a quality factor of 27,000 in a device fabricated with a slot size of 70 nm, a ring to input waveguide edge to edge separation of 650 nm, and a coupling distance of 1.6 μm. The radius of the circular part of the slotted oval was 50 μm. This resonance was observed near 1488 nm, and the resonance peak had an extinction ratio of 4.5 dB. FIG. 5 shows the measured transmission spectrum past the ring, normalized for the input coupler baseline efficiency of our test system. FIG. 6 shows the details of one peak in the vicinity of 1488 nm. Because the extinction ratio at the resonance peak was not very large in this case, it was not possible to accurately determine waveguide losses from this device. By measuring many devices with different geometries, we obtained data on resonators with higher extinction ratios that approached critical coupling. One such device was a 50 μm radius slotted ring resonator with a 60 nm waveguide gap, a ring to input waveguide spacing of 550 nm and coupling length of 1.6 μm. In this device, a Q of 23,400 was observed near 1523 nm, with an on-resonance extinction of 14.7 dB.

Since this resonance is nearly critically coupled, the waveguide loss can be estimated using equation (1) as −10 dB/cm. We can also use equation (2) to further validate our theoretical picture of the ring resonator. The observed free spectral range of this resonator was 2.74 nm, while equation (2) predicts 2.9 nm. This discrepancy is most likely due to small differences in the fabricated dimensions as compared to those for which the numerical solutions were obtained.

To further validate the waveguide loss result, several waveguide loss calibration loops were fabricated with varying lengths of the slot waveguide, ranging from 200 to 8200 μm in length. A total of five center slot waveguide devices were studied for each of the 50, 60 and 70 nm slot widths. Linear regression analysis on the peak transmission of each series yielded waveguide loss figures of 11.6±3.5 dB/cm for the 50 nm center waveguide, 7.7±2.3 dB/cm for the 60 nm center waveguide, and 8.1±1.1 dB/cm for the 70 nm center waveguide. These figures are in agreement with the loss estimated from the oval resonator. Since the theoretical loss due to substrate leakage is much lower than this, it is clear that a great deal of loss is due to surface roughness and possibly material absorption. It is believed that engineering improvements will decrease this loss further. For sensing and modulation applications as well as use in nonlinear optics, the high optical field concentration that can be supported in the cladding material of the slotted waveguide geometry should be very advantageous when compared to more conventional waveguides.

Figure 7:
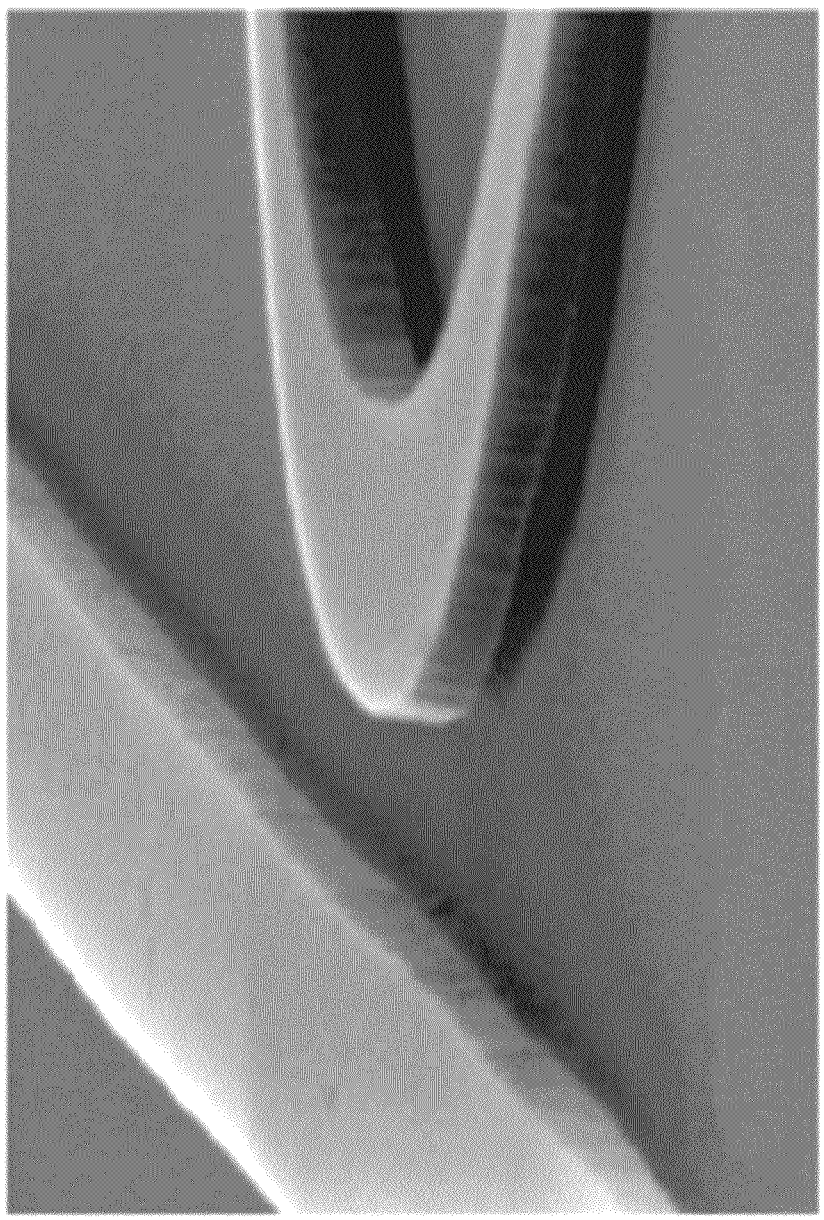
FIG. 7 is a diagram showing a shallow angle SEM view of a typical silicon-on-insulator ring resonator and waveguide having a sidewall roughness on the order of 10 nm.
Figure 8:
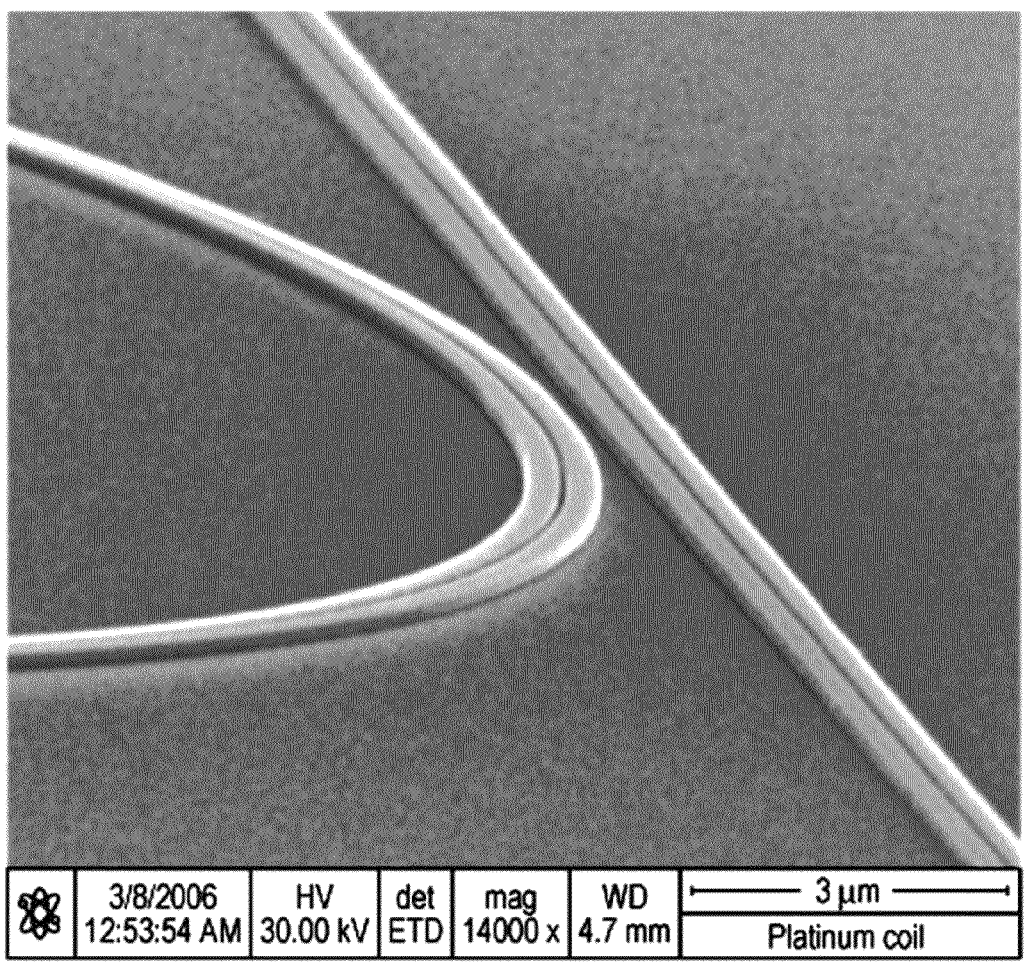
FIG. 8 is a diagram of a slot ring resonator directional coupler region, and the associated input waveguide.

FIG. 7 is a diagram showing a shallow angle SEM view of a silicon-on-insulator ring resonator and waveguide having a sidewall roughness on the order of 10 nm. In the exemplary waveguide shown in FIG. 7, the silicon-insulator bond has been decorated with a brief buffered oxide etch. FIG. 8 is a diagram of a slot ring resonator directional coupler region, and the associated input waveguide.

Figure 9:
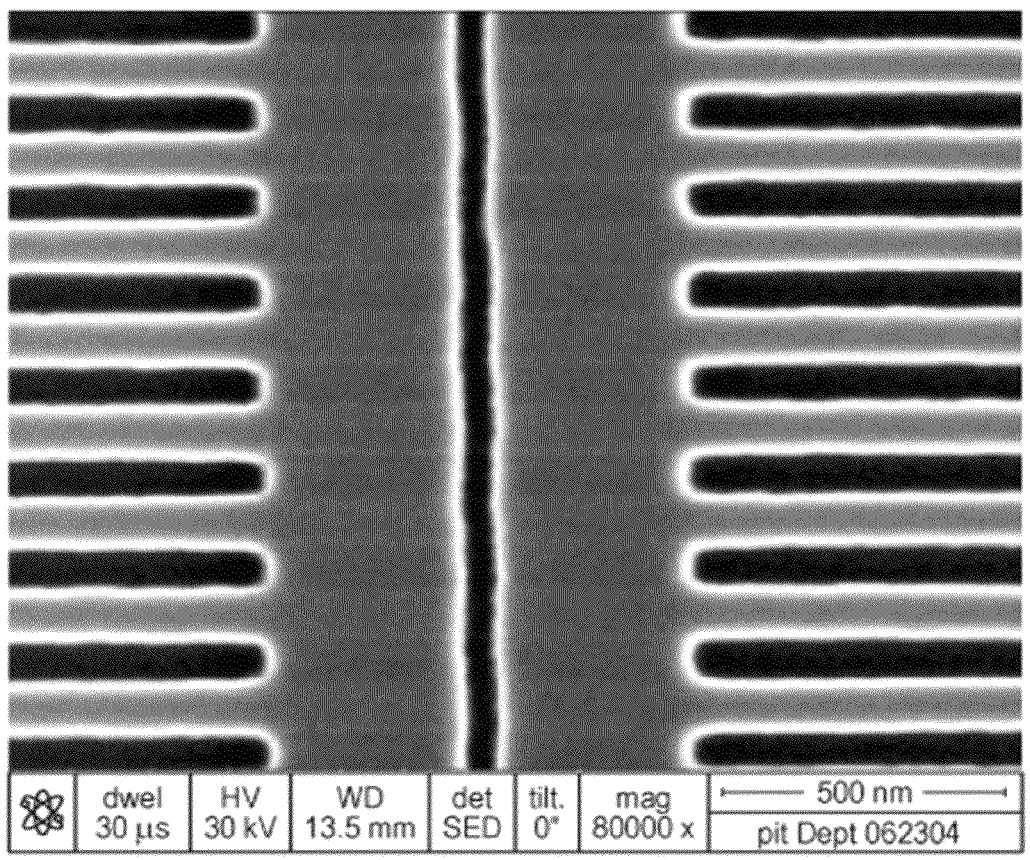
FIG. 9 is a diagram showing an exemplary high-index segmented waveguide structures, which in the embodiment shown comprises a central waveguide portion with fingers or ridges sticking out to the sides.

Other variations on the geometry of waveguides are possible. FIG. 9 is a diagram showing an exemplary high-index segmented waveguide structures, which in the embodiment shown comprises a central waveguide portion with fingers or ridges sticking out to the sides. With the light localized in the center in a Bloch mode, electrical contact can be established using the fingers or ridges that stick off the sides of the waveguide. This structure provides a way to form both electrical contacts to waveguides and structures that would provide electrical isolation with low optical loss. Through an iterative process involving a combination of optical design using a Hermetian Bloch mode eigensolver and fabrication of actual structures, it was found that (non-slotted) segmented waveguide structures could be constructed in 120 nm thick SOI. Waveguide losses as small as −16 dB per centimeter were observed, and insertion losses as small as −0.16 dB were shown from standard silicon waveguides.

Figure 10A:
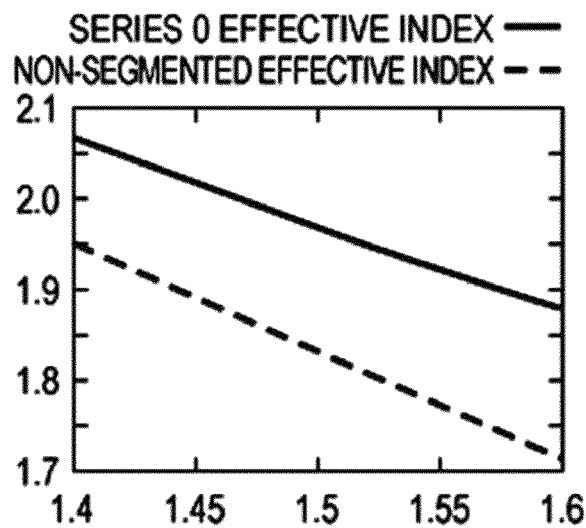
FIG. 10A is a diagram that shows a dispersion diagram of both a segmented waveguide and the normal, unsegmented waveguide, taken on a plane parallel to the substrate that on a z plane that intersects the middle of a segment.
Figure 10B:
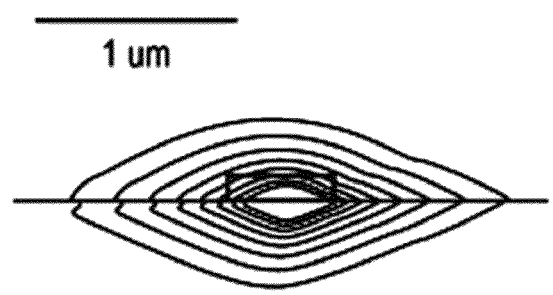
FIG. 10B is a diagram that shows modal patterns of the Bloch mode, with contours of |E| plotted, starting at 10% of the max value and with contour increments of 10%.
Figure 10C:
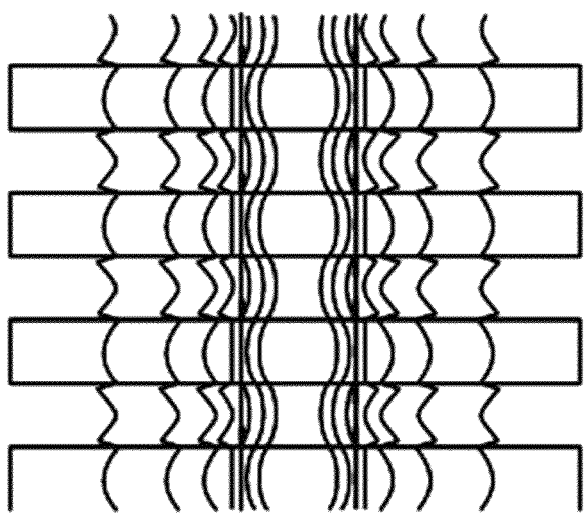

The segmented waveguide structure can also be modeled as regards its expected properties, which can then be compared to actual results. FIG. 10A is a diagram that shows a dispersion diagram of both a segmented waveguide and the normal, unsegmented waveguide, taken on a plane parallel to the substrate that on a z plane that intersects the middle of a segment. FIG. 10B is a diagram that shows modal patterns of the Bloch mode, with contours of |E| plotted, starting at 10% of the max value and with contour increments of 10%. FIG.

10C is a diagram that shows a plot of modal patterns over four periods of a segmented waveguide on a horizontal plane that intersects the silicon layer halfway through.

Figure 11:
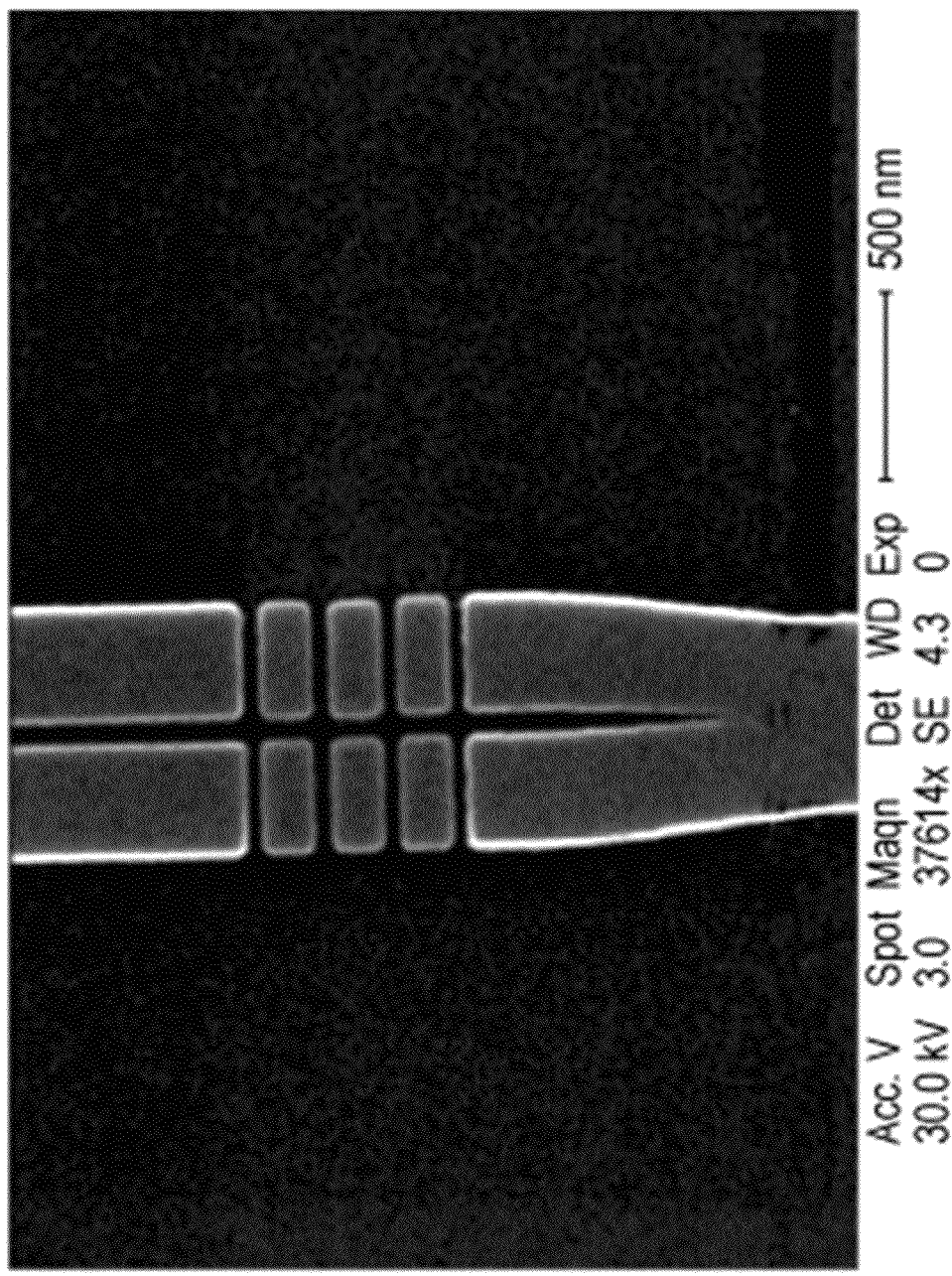
FIG. 11 is a diagram that shows an exemplary electrical isolator that was constructed and tested, and which provided both a transition from a standard to a slotted waveguide and electrical isolation between the two sides of the slot waveguide.

By utilizing the same type of design methodology as was used for the segmented waveguides, one is able to able to construct structures that provide electrical isolation without substantial optical loss. FIG. 11 is a diagram that shows an exemplary electrical isolator that was constructed and tested, and which provided both a transition from a standard to a slotted waveguide and electrical isolation between the two sides of the slot waveguide. Such structures were shown to have losses on the order of 0.5 dB.

Optical Modulation and Detection in Slotted Silicon Waveguides

In this example, we describe a system and process that provide low power optical detection and modulation in a slotted waveguide geometry filled with nonlinear electro-optic polymers and present examples that demonstrate such methods. The nanoscale confinement of the optical mode, combined with its close proximity to electrical contacts, enables the direct conversion of optical energy to electrical energy, without external bias, via optical rectification, and also enhances electro-optic modulation. We demonstrate this process for power levels in the sub-milliwatt regime, as compared to the kilowatt regime in which optical nonlinear effects are typically observed at short length scales. The results presented show that a new class of detectors based on nonlinear optics can be fabricated and operated.

Waveguide-based integrated optics in silicon provide systems and methods for concentrating and guiding light at the nanoscale. The high index contrast between silicon and common cladding materials enables extremely compact waveguides with very high mode field concentrations, and allows the use of established CMOS fabrication techniques to define photonic integrated circuits. By using slotted waveguides, it is possible to further concentrate a large fraction of the guided mode into a gap within the center of a silicon waveguide. This geometry greatly magnifies the electric field associated with the optical mode, resulting in electric fields of at least (or in excess of) $10^6$ V/m for continuous-wave, sub-milliwatt optical signals. Moreover, since the slotted geometry comprises two silicon strips which can be electrically isolated, a convenient mechanism for electro-optic interaction is provided. Such waveguides can be fabricated with low loss. We have previously described systems that provide losses below −10 dB/cm.

In the present example, we exploit both the high intensity of the optical field and the close proximity of the electrodes for several purposes. First, we demonstrate detection of optical signals via direct conversion to electrical energy by means of nonlinear optical rectification. An exemplary device comprises a ring resonator with an electro-optic polymer based $\chi^2$ material deposited as a cladding. Inside the slot, the high optical field intensity creates a standing DC field, which creates a virtual voltage source between the two silicon electrodes, resulting in a measurable current flow, in the absence of any external electrical bias. Though optical rectification has been observed in electro-optic polymers, typically instantaneous optical powers on the order of 1 kW are needed for observable conversion efficiencies, often achieved with pulsed lasers. The exemplary embodiment provides measurable conversion with less than 1 mW of non-pulsed input, obtained from a standard, low power tunable laser operating near 1500 nm.

In one embodiment, systems and methods of the invention provide standard Pockels' effect based modulation, which is similarly enhanced by means of the very small scale of our device. The close proximity of the electrodes, and ready overlap with the optical mode, causes an external voltage to produce a far larger effective electric modulation field, and therefore refractive index shift, than would be obtained through conventional waveguide designs. In one embodiment, the modulation and refractive index shift is provided by tuning the resonance frequencies of a slot waveguide ring resonator.

Device Fabrication

Waveguide Fabrication

The devices described in this example were fabricated in electronic grade silicon-on-insulator (SOI) with a top layer thickness of 110 nm and an oxide thickness of 1.3 microns. The silicon layer is subsequently doped to approximately $10^{19}$ Phosphorous atoms/cm$^3$, yielding resistivities after dopant activation of about 0.025 ohm-cm. Electro-optic ("EO") polymers were then spin-deposited onto the waveguide structures and subsequently poled by using a high field applied across the slot in the waveguide.

Lithography was performed using a Leica EBPG 5000+ electron beam system at 100 kv. Prior to lithography, the samples were manually cleaved, cleaned in acetone and isopropanol, baked for 20 minutes at 180 C, coated with 2 percent HSQ resist from Dow Corning Corporation, spun for two minutes at 1000 rpm, and baked for an additional 20 minutes. The samples were exposed at 5 nm step size, at 3500 μC/cm$^2$. The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then implanted with phosphorous at normal incidence, 30 keV energy, and $1 \times 10^{14}$ ions/cm$^2$ density. The sample was annealed under a vacuum at 950 C in a Jipilec Jetstar rapid thermal annealer. The samples were dipped in buffered hydrofluoric acid in order to remove the remnants of electron beam resist from the surface.

After initial optical testing, the samples were coated with YLD 124 electro-optic polymer, and in one case with dendrimer-based electro-optic material. The samples were stored under a vacuum at all times when they were not being tested, in order to reduce the chances of any degradation.

Measurement Results

Optical Rectification Based Detection

Figure 12:
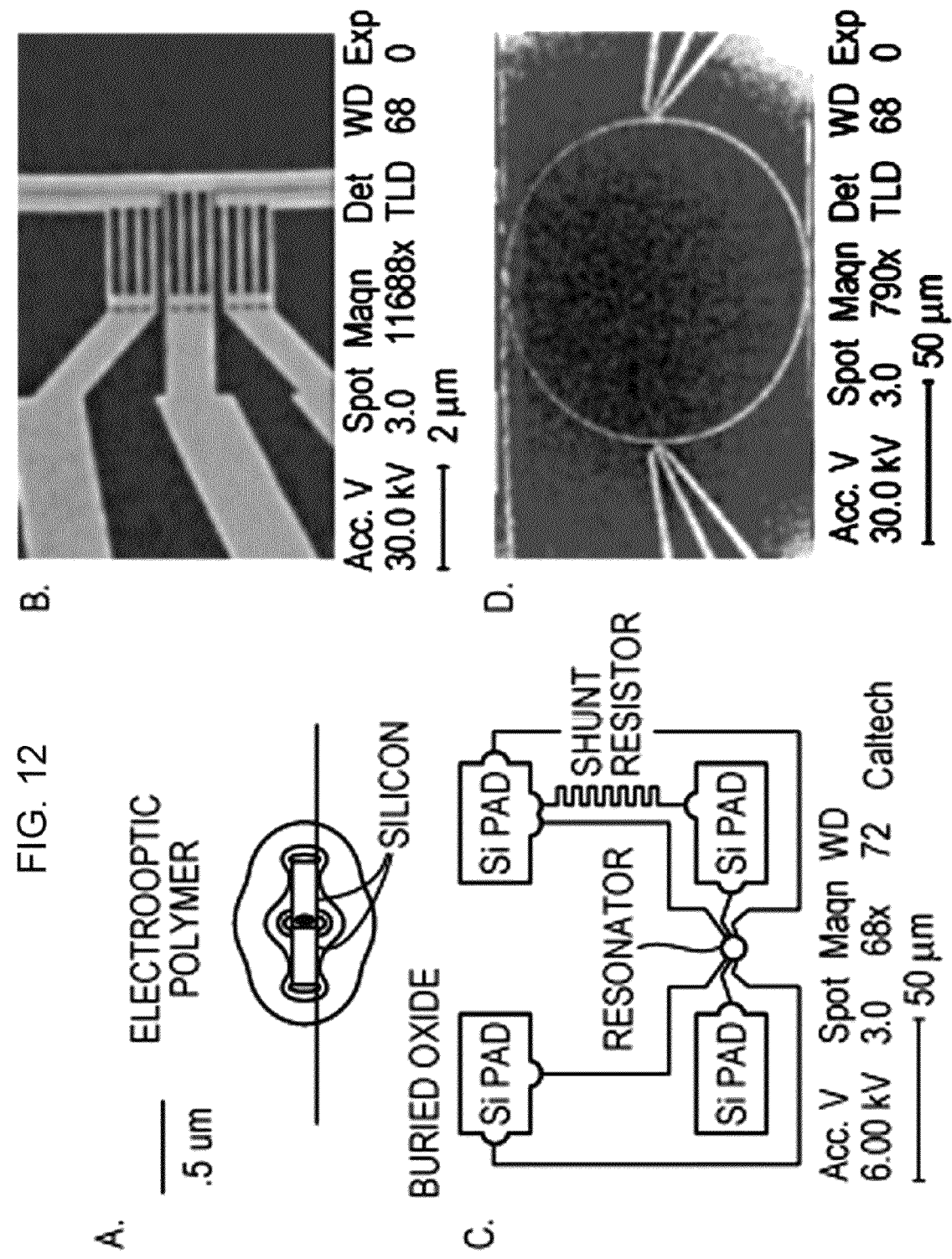
FIG. 12 is a four panel diagram that shows details of one embodiment of an optical modulator device, including the geometry of the photodetectors and filters, and including a cross section of the slotted waveguide.

FIG. 12 is a four panel diagram that shows details of one embodiment of an optical modulator device, including the geometry of the photodetectors and filters, and including a cross section of the slotted waveguide. Panel A of FIG. 12 shows a cross section of the device geometry with optical mode superimposed on a waveguide. In FIG. 12A, the optical mode was solved using a finite-difference based Hermetian Eigensolver, such as that described by A. Taflove, *Computational Electrodynamics*, (Artech House, Boston. Mass. 1995), and has an effective index of approximately 1.85 at 1500 nm. Most of the electric field is parallel to the plane of the chip, and it is possible to contact both sides of the slot in a slotted ring resonator, as shown in FIG. 12B, which shows a SEM image of the resonator electrical contacts. Electrically isolated contacts between the silicon rails defining the slotted waveguide introduce only about 0.1 dB of optical loss. FIG. 12C shows the logical layout of device, superimposed on a SEM image of a device. FIG. 12C details the layout of a complete slotted ring resonator, with two contact pads connected to the outer half of the ring, and two pads electrically connected to the inner half of the ring. A shunt resistor provides a means of confirming electrical contact, and typical pad-to-pad and pad-to-ring resistances range from 1 mΩ to 5 MΩ. FIG. 12D displays a typical electrically contacted slotted ring as presently described. FIG. 12D is an image of the ring and the electrical contact structures.

Measurements were performed with single-mode polarization maintaining input and output fibers, grating coupled to slotted waveguides with an insertion loss of approximately 8 dB. Optical signal was provided from an Agilent 81680a tunable laser and in some cases an erbium doped fiber amplifier ("EDFA") from Keopsys Corporation. A continuous optical signal inserted into a poled polymer ring results in a measurable current established between the two pads, which are electrically connected through a pico-Ammeter. In the most sensitive device, a DC current of ~1.3 nA was observed, indicating an electrical output power of $\sim 10^{-9}$ of the optical input power ($5 \times 10^{-12}$ W of output for approximately 0.5 mW coupled into the chip). Control devices, in which PMMA or un-poled EO material was substituted, show no photocurrent.

The fact that there is no external bias (or indeed any energy source) other than the optical signal applied to the system of this embodiment demonstrates conclusively that power is being converted from the optical signal. To establish that the conversion mechanism is actually optical rectification, we performed a number of additional measurements. A steady bias was applied to the chip for several minutes, as shown in Table 1A. A substantial change in the photoresponse of the device was observed. This change depends on the polarity of the bias voltage, consistent with the expected influence of repoling of the device in-place at room temperature. Specifically, if the external bias was applied opposing the original poling direction, conversion efficiency generally decreased, while an external bias in the direction of the original poling field increased conversion efficiency.

TABLE I

Polling Results

Part A:

| Action | New Steady State Current (6 dBm input) |
|---|---|
| Initial State | −5.7 pA |
| +10 V for 2 minutes | 0 pA |
| −10 V for 2 minutes | −7.1 pA |
| +10 V for 2 minutes | −4.4 pA |
| +10 V for 4 minutes | −6.1 pA |
| −10 V for 4 minutes | −4.5 pA |
| −10 V for 2 minutes | −14.8 pA |

Part B:

| Device | Action | Current Polarity of Optical Rectification |
|---|---|---|
| 1 | Positive Poling | Positive |
| 1 | Thermal Cycling to poling temperature with no voltage | Rapid fluctuation, did not settle |
| 1 | Negative Poling | Negative |
| 2 | Negative Poling | Negative |
| 2 | Thermal Cycling to Poling temperature with no voltage | None observable |
| 2 | Positive Poling | Negative |
| 3 | Negative Poling | Negative |
| 4 | Positive Poling | Positive |
| 5 | Negative Poling | Negative |

To further understand the photo-conversion mechanism, 5 EO detection devices were poled with both positive and negative polarities, thus reversing the direction of the relative $\chi^2$ tensors. For these materials, the direction of $\chi^2$ is known to align with the polling E field direction, and we have verified this through Pockels' effect measurements. In all but one case, we observe that the polarity of the generated potential is the same as that used in poling, and the +V terminal during poling acts as the −V terminal in spontaneous current generation, as shown in Table 1B. Furthermore, the polarity of the current is consistent with a virtual voltage source induced through optical rectification. It was observed that these devices decay significantly over the course of testing, and that in one case the polarity of the output current was even observed to spontaneously switch after extensive testing. However, the initial behavior of the devices after polling seems largely correlated to the $\chi^2$ direction.

Part A of Table I shows the dependence of the steady state observed current after room temperature biasing with various voltage polarities for one device. The device was originally polled with a ~12 V bias, though at 110 C. With one exception, applying a voltage in the direction of the original polling voltage enhances current conversion efficiencies, while applying a voltage against the direction of the polling voltage reduces the current conversion efficiencies. It should be noted that the power coupled on-chip in these measurements was less than 1 mW due to coupler loss.

Part B of Table I shows the behavior of several different devices immediately after thermal polling or cycling without voltage. Measurements were taken sequentially from top to bottom for a given device. The only anomaly is the third measurement on device 2; this was after significant testing, and the current observed was substantially less than was observed in previous tests on the same device. We suspect that the polymer was degraded by repeated testing in this case.

Analysis of Data for Optical Rectification

To derive the magnitude of the expected photocurrent, we assume that the magnitude relating to the Pockels' effect is similar to that for optical rectification. A measurement of $\chi^2$ can then be obtained from the direct observation of the electro-optic coefficient by the standard measurements described earlier. The typical measured tuning value of 2 GHz/V yields approximately 50 μm/V.

In the best case, devices with 6 dBm of input power returned approximately 1.4 nA of current. With Qs ranging from 3 k to 5 k, and assuming approximately 7 dB of insertion loss in the input grating coupler on one of our chips, in the best case as much as 0 dBm might be circulating in a resonator on resonance. This implies a peak electric field due to the optical signal of approximately $3.1 \times 10^6$ V/m. The induced static nonlinear polarization field is then nearly 1000 V/m, which amounts to a voltage drop of $14 \times 10^{-5}$ V across a 140 nm gap. If this voltage is assumed to be perfectly maintained, and the load resistance is assumed to be 5 MΩ, then 28 pA would be generated, about a factor of 100 less than is observed in the largest measurement made, but within a factor of 20 of the typical measurement of 352 pA for 6 dBm of input. Significantly, because the generated current is quadratic in E, it is clear that the current will be linearly proportional to the input intensity. This is in accordance with our observations. The best results for optical rectification were obtained with YLD 124/APC polymer, whereas our best Pockels' Effect results were obtained with the dendrimer materials.

Significantly, the sign of the output current matches that which would be predicted by nonlinear optical rectification, as discussed above. Specifically, since positive current emanates from the positive terminal, the rectified E field has a sign reversed from the $\chi^2$ and the polling E field. It is well established that the $\chi^2$ direction tends to align with the direction of the polling E field. Because of this, the rectified field acting as a voltage source will produce an effective positive terminal at the terminal that had the positive polling voltage.

We do not yet fully understand the current generation mechanism. In particular, it is not clear what provides the mechanism for charge transport across the gap. The APC material in which the nonlinear polymer is hosted is insulating, and though it does exhibit the photoconductivity effect due to visible light, it is unclear whether it can for near-infrared radiation. Photoconductivity due to second harmonic generation may play a role in this effect. It is certainly the case, however, that current flows through this gap; that is the only region in the entire system where an electromotive force exists. Also, photoconductivity alone is not adequate to explain the reversal of the current coming from the detector devices when the poling direction is reversed, nor the conversion of the optical input into directed current in general. The only mechanism to our knowledge that adequately explains this data is optical rectification.

If we assume that it will be possible to achieve a 10-fold improvement in the Q's of the resonators, while still getting more than 10 dB of extinction, then the intensity circulating in such a ring would be about 13 dB up from the intensity of the input wave. By comparison, with a Q of about 1000 and high extinction, the peak circulating intensity is about the same as the intensity in the input waveguide. Therefore, it is reasonable to expect that it will be possible to get at least 10 dB of improvement in the circulating intensity, and thus in the conversion efficiency, by fabricating higher Q rings.

By combining the nano-scale slotted waveguide geometry with electro-optical polymers having high nonlinear constants, we have obtained massive enhancement of the optical field. That has in turn enabled us to exploit nonlinear optical processes that are typically only available in the kW regime in the sub-mW regime. This difference is so considerable that we believe it represents a change in kind for the function of nonlinear optical devices. In addition, it is believed that this hybrid material system provides systems and methods for creating compact devices that exploit other nonlinear phenomena on-chip.

Optical rectification based detectors can have many advantages over currently available technology. In particular, such detectors are expected to function at a higher intrinsic rate than the typical photodiode in use, as the optical rectification process occurs at the optical frequency itself, on the order of 100 THz in WDM systems. The absence of an external bias, and the generation of a voltage rather than a change in current flow, both provide certain advantages in electronic operation. We also believe that a device based on nonlinear optical rectification will not suffer from the limitation of a dark current. This in turn can provide WDM systems that will function with lower optical power, providing numerous benefits. Similarly, our demonstration of enhanced modulation using these waveguide geometries provides useful components for future communications systems.

We believe that there will be advantageous economic aspects of such devices in various embodiments. Because our devices can be fabricated in planar electronics grade silicon-on-insulator, using processes compatible with advanced CMOS processing, it is expected that devices embodying these principles will be less expensive to fabricate.

Optical Modulators

Optical modulators are a fundamental component of optical data transmission systems. They are used to convert electrical voltage into amplitude modulation of an optical carrier frequency, and they can serve as the gateway from the electrical to the optical domain. High-bandwidth optical signals can be transmitted through optical fibers with low loss and low latency. All practical high-speed modulators that are in use today require input voltage shifts on the order of 1V to obtain full extinction. However it is extremely advantageous in terms of noise performance for modulators to operate at lower drive voltages. Many sensors and antennas generate only millivolts or less. As a result it is often necessary to include an amplifier in conventional optical transmission systems, which often limits system performance. By using silicon nano-slot waveguide designs and optical polymers, it is possible today to construct millivolt-scale, broadband modulators. In some embodiments, a millivolt-scale signal is one having a magnitude in the range of hundreds of millivolts down to units of millivolts. Using novel nanostructured waveguide designs, we have demonstrated a 100× improvement in V$\pi$ over conventional electro-optic polymer modulators.

A variety of physical effects are available to produce optical modulation, including the acousto-optic effect, the Pockels effect either in hard materials, such as lithium niobate or in electro-optic polymers, free-carrier or plasma effects, electro-absorption, and thermal modulation. For many types of optical modulation, the basic design of a modulator is similar; a region of waveguide on one arm of a Mach-Zehnder interferometer is made to include an active optical material that changes index in response to an external signal. This might be, for instance, a waveguide of lithium niobate, or a semiconductor waveguide in silicon. In both cases, a voltage is introduced to the waveguide region by means of external electrodes. This causes the active region to shift in index slightly, causing a phase delay on the light traveling down one arm of the modulator. When the light in that arm is recombined with light that traveled down a reference arm, the phase difference between the two signals causes the combined signal to change in amplitude, with this change depending on the amount of phase delay induced on the phase modulation arm. Other schemes, where both arms are modulated in order to improve performance, are also common.

Figure 13:
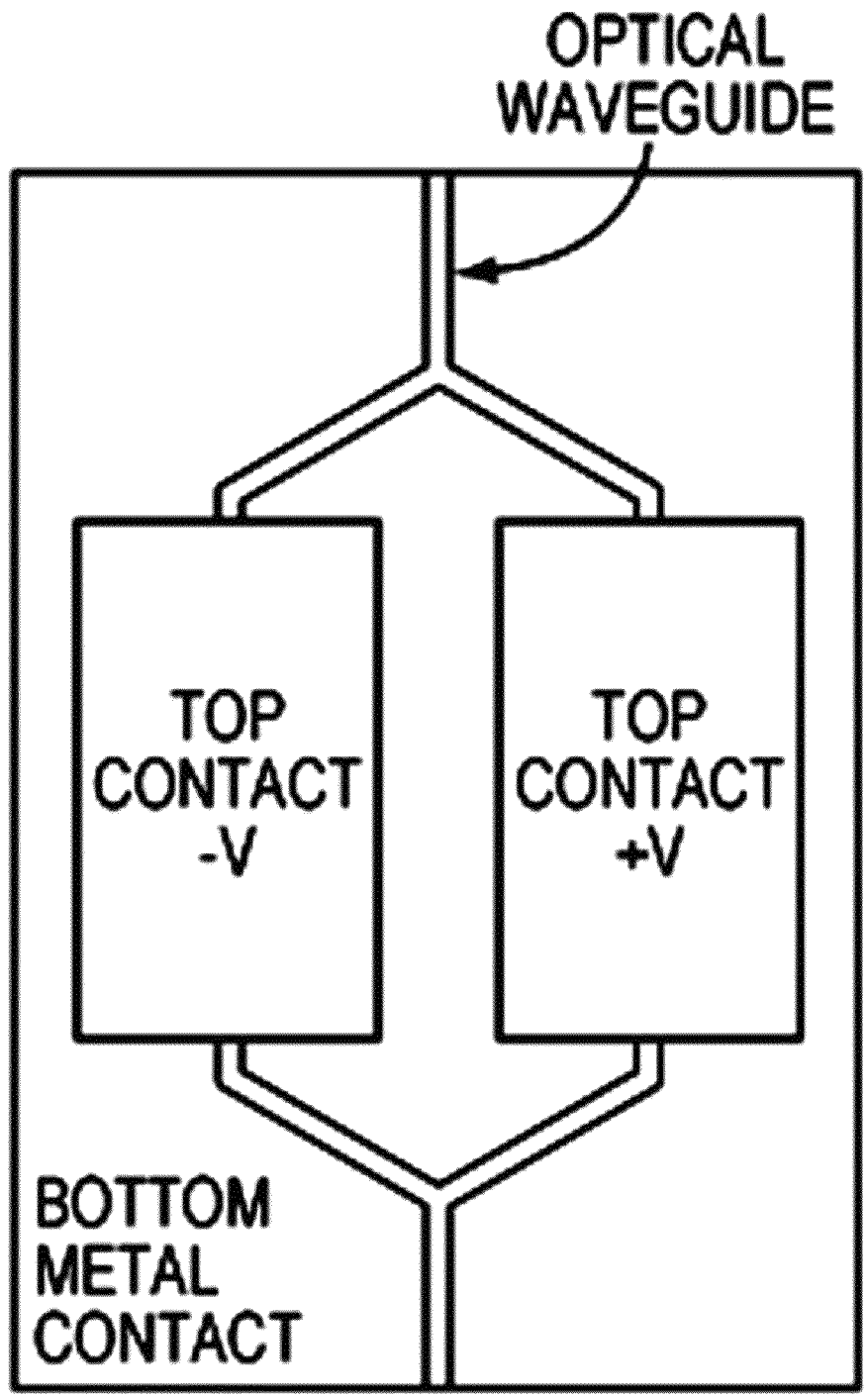
FIG. 13 shows a diagram of a Mach-Zehnder modulator with a conventional electrode geometry in top-down view, including top contact, waveguide, and bottom contact layers.

The measure of the strength of a modulation effect is how much phase shift is obtained for a given input voltage. Typical conventional modulators obtain effective index shifts on the order of 0.004% for 1 V. This implies that a Mach-Zehnder 1 cm in length, meant to modulate radiation near 1550 nm, would require 1 V of external input for the arms to accumulate a relative phase shift of $\pi$ radians. The half wave voltage $V_\pi$ (or $V_{pi}$) is the voltage needed for an interarm phase shift of $\pi$ radians (or 180 degrees). Lower values for $V_\pi$ imply that less power is needed to operate the modulator. Often, the responsivity, a length-independent product $V_\pi$-L is reported. Typical $V_\pi$-L values are in the range of 8 Vcm in silicon, or 6 V-cm for lithium niobate modulators. This voltage-length product, or responsivity, is an important figure of merit for examining a novel modulator design. Making a modulator physically longer generally trades lower halfwave voltage against reduced operating frequency and higher loss. Because generating high-speed and high-power signals requires specialized amplifiers, particularly if broadband performance is required, lowering the operating voltage of modulators is extremely desirable, particularly for on-chip integrated electronic/photonic applications, (including chip-to-chip interconnects) where on-chip voltages are limited to levels available in CMOS. FIG. 13 shows a diagram of a Mach-Zehnder modulator with a conventional electrode geometry.

FIG. 13 is a top-down view of a simple conventional Mach-Zehnder polymer interferometer, showing top contact, waveguide, and bottom contact layers. Such a device is usually operated in 'push/pull' mode, where either opposite voltages are applied to the different arms, or where the two arms are poled in opposite directions to achieve the same effect.

In the past several years, silicon has gained attention as an ideal optical material for integrated optics, in particular at telecommunications wavelengths. Low loss optical devices have been built, and modulation obtained through free carrier effects. One of the waveguides that can be supported by silicon is the so-called slot waveguide geometry. This involves two ridges of silicon placed close to each other, with a small gap between them. We have demonstrated modulation regions based on filling this gap with a nonlinear material, and using the two waveguide halves as electrodes. In such a geometry, the silicon is doped to a level that allows electrical conductivity without causing substantial optical losses. This allows the two wires or ridges to serve both as transparent electrical contacts and as an optical waveguide.

Using slot waveguides, we previously obtained an improvement in modulation strength of nearly 5× when compared to the best contemporary conventional waveguide geometries with electrodes separated from the waveguide, with the initial, non-optimized designs. This improvement was based on the remarkably small width of the gap across which the driving voltage drops. It is expected that smaller gaps translate into higher field per Volt, and the Pockels Effect depends on the local strength of the electric field. The smaller the gap, the larger the index shift. A unique property of slot waveguides is that, even as these gaps become nanoscale, the divergence conditions on the electric field require that much of the optical mode remains within the central gap. As a result, changing the index within a nanoscale gap can give a remarkably large change in the waveguide effective index. Because of these divergence conditions, the optical mode's effective index is largely determined by the shift found even in very small gaps.

Low $V_\pi$ modulators

Several major approaches toward achieving low $V_\pi$ modulation have recently been pursued. The free-carrier dispersion effect in silicon waveguides has been used. Green et al. achieved a $V_\pi$ of 1.8 V with this effect. Modulators based on lithium niobate are also frequently used. Typical commercially obtained $V_\pi$ values are 4 V. Recently, Mathine and co-workers have demonstrated a nonlinear polymer based modulator with a V, of 0.65 V. For the devices produced by others, the attained values of $V_\pi$ are large.

A number of approaches have been proposed for developing low $V_\pi$ modulators. Different proposed approaches rely the development of new electrooptic materials, or on optical designs that trade bandwidth for sensitivity, either through the use of resonant enhancement, or through dispersion engineering. The designs presented herein are based upon conventional, high-bandwidth Mach-Zehnder traveling wave approaches, but achieve appreciable benefits from using nano-slot waveguides. Of course, these designs can also take advantage of the newest and best electrooptic polymers. In principle, any material that can be coated conformally onto the surface of the silicon waveguides and that is reasonably resistive could be used to provide modulation in these systems, making the system extremely general.

The most recent nonlinear polymers achieve a high nonlinear coefficient, expressed as an $r_{33}$ of 500 pm/V. Using this in combination with the high susceptibilities described above, it is believed that it is possible today to construct a 1 cm Mach-Zehnder modulator with a $V_\pi$ of 8 mV. This corresponds to a ring resonator with a tuning sensitivity of 795 GHz/V. Both of these values are two orders of magnitude better than the performance obtained by current approaches. Current commercially available modulators typically have $V\pi$'s from 1 to 9 V, and current tunable electro-optic polymer based resonators achieve 1 GHz/V of tunability. If the $r_{33}$ value of 33 μmN demonstrated by Tazawa and Steier for conventional polymer designs is used, then a $V_\pi$ of 64 mV and a resonator tunability of 50 GHz/V are obtained.

Segmented waveguide contact structures can be formed that allow very low resistance electrical contact to slot waveguides. We have described above, in similar circumstances, electrical contact to waveguides can be established via segmented waveguides. See FIG. 12B and FIG. 12D and the discussion related thereto. When the RC circuits implied by the segmentation geometry and the gap are examined, it is found that RC turn on times on the order of 200 GHz or more are achievable. Because the nonlinear polymers exhibit an ultrafast nonlinearity, these waveguide geometries present a path to making Terahertz scale optical modulators. Because the modulation is so strong, it is also possible to trade the length of the modulator against $V_\pi$. For example, our optimal geometry is expected obtain a Vπ of 0.6 V with a 100 μm long Mach-Zehnder modulator. This device is expected be exceptionally simple to design for 10 GHz operation, as it could likely be treated as a lumped element. We have shown above that lateral contact structures with low loss and low resistance can be constructed with these slot waveguides. See FIG. 12B and FIG. 12D and the discussion related thereto.

We believe these nano-slot waveguide designs present a path to realizing very high speed, low voltage modulators. It is advantageous to be able to attain a responsivity $V_\pi$-L of less than 1 V-cm. The physical principles involved in such devices are based on employing a nonlinear material of at least moderate resistivity, and a high index contrast waveguide with tight lithographic tolerances. Therefore, it is expected that nano-slot waveguides, either as Mach-Zehnder or ring-based devices, are likely an advantageous geometry for optical modulation with nonlinear materials in many situations. In addition, materials compatibility and processing issues are greatly reduced for such devices compared to conventional multilayer patterned polymer modulator structures.

These high index contrast devices have (or are expected to have) extremely small bend radii, which are often orders of magnitude smaller than corresponding all-polymer designs with low loss and high Q. These geometric features translate into extremely high free spectral ranges for ring modulators, compact devices, and wide process latitudes for their fabrication. Given the inexpensive and readily available foundry SOI and silicon processes available today, and the commercial availability of electron beam lithography at sub-10 nm line resolution, it is expected that slot-waveguide based modulators are likely to replace conventional modulators in many applications in the coming years.

Waveguide Geometries

Figure 14:
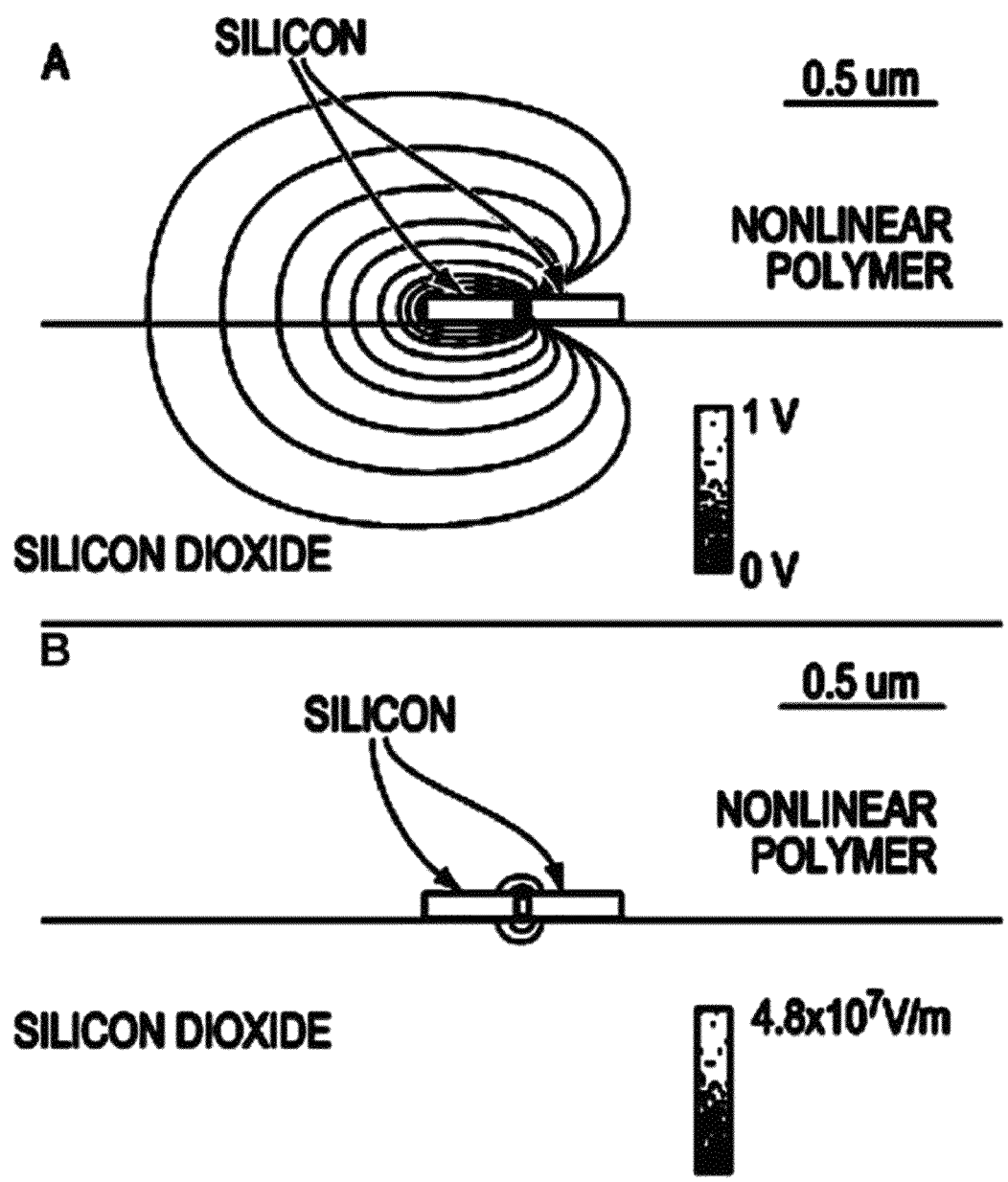
FIG. 14A shows the static voltage potential field distribution due to charging the two electrodes.
FIG. 14B shows the electric field due to the potential distribution. |E| is plotted in increments of 10%.

We now describe several different waveguide geometries, and show the effective index susceptibility as a function of the slot sizes of the waveguide. The susceptibilities are calculated near a 1550 nm free space wavelength. However, the values obtained will not vary much from 1480 nm to 1600 nm as the modal pattern does not change significantly. In the embodiments described, the waveguides are composed of silicon, and assumed to rest on a layer of silicon dioxide. The top cladding is a nonlinear polymer with an index of 1.7. This is similar to the waveguide geometry that we have used in our modulation work described hereinabove. FIG. 14 shows the static electric fields solved as part of analyzing waveguide design 1 with a gap of 40 nm, as described in Table 2. As one would expect, the field is nearly entirely concentrated inside the slot area. The field shown was calculated assuming a voltage difference of 1 Volt. It is slightly larger than simply the reciprocal of the gap size due to the singular nature of the solution to Poisson's equation near the corners of the waveguide.

FIG. 14A and FIG. 14B illustrate solved field patterns for the analysis of waveguide 1 at a 40 nm gap. FIG. 14A shows the static voltage potential field distribution due to charging the two electrodes. FIG. 14B shows the electric field due to the potential distribution. |E| is plotted in increments of 10%.

We have constrained ourselves to use waveguide geometries that have minimum feature sizes of at least 20 nm. These are near the minimum feature sizes that can be reliably fabricated using e-beam lithography. Table 2 lists a description of each type of waveguide studied. Each waveguide was studied for a number of different gap sizes. In all cases, the maximum susceptibility was obtained at the minimum gap size. The maximum gap size studied and the susceptibility at this point are also listed. In some cases, the study was terminated because at larger gap sizes, the mode is not supported; this is noted in Table 2. For multislot waveguide designs where there are N arms, there are N−1 gaps; the design presumes that alternating arms will be biased either at the input potential or ground.

Table 2 shows the effective index susceptibility for various waveguide designs. The susceptibility is approximately inversely proportional to gap size.

It is clear that within the regime of slotted waveguides, it is always advantageous to make the slot size smaller, at least down to the 20 nm gap we have studied. This causes the DC electric field to increase, while the optical mode tends to migrate into the slot region, preventing any falloff due to the optical mode failing to overlap the modulation region.

TABLE 2

| Waveguide Design | Waveguide Height (nm) | Arm Sizes (nm) | Maximum γ ($\mu m^{-1}$) | Minimum γ ($\mu m^{-1}$) |
|---|---|---|---|---|
| 1 | 100 | 300, 300 | 1.3, 20 nm gap | .40, 140 nm gap |
| 2 | 150 | 300, 300 | 1.6, 20 nm gap | .68, 120 nm gap |
| 3 | 200 | 300, 300 | 2.3, 20 nm gap | .74, 120 nm gap |
| 4 | 100 | 400, 400 | 1.1, 20 nm gap | .67, 60 nm gap, modal limit |
| 5 | 100 | 250, 250 | 1.2, 20 nm gap | .56, 60 nm gap, modal limit |
| 6 | 100 | 300, 40, 300 | 1.6, 20 nm gap | .53, 80 nm gap, modal limit |
| 7 | 100 | 300, 40, 40, 300 | 1.9, 20 nm gap | .76, 60 nm gap, modal limit |
| 8 | 200 | 200, 40, 200 | 3, 20 nm gap | 1.4, 60 nm gap, modal limit |
| 9 | 300 | 300, 300 | 2.5, 20 nm gap | 2.5, 20 nm gap, modal limit |
| Steier et al. | N/A | N/A | .026, 10 μm gap | N/A |

In examining the results of our calculations, it is useful to calculate the maximum susceptibilities that can be obtained. For an effective index of about 2, which is approximately correct for these waveguides, and a gap size of 20 nm, the maximum achievable γ is approximately 12.5 $\mu m^{-1}$. Thus, for a gap size of 20 nm, waveguide design 8 is already within 25% of the theoretical maximum value.

It is also worth noting the corresponding γ value that can be obtained by calculation using our methods for the separated electrode approach of Steier. The effective index of the mode is expected to be about 1.8, and the gap distance for the dc field is 10 um. Under the most optimistic assumptions about mode overlap with the active polymer region (that is, assuming complete overlap), this corresponds to a γ of about 0.03 $\mu m^{-1}$.

It is useful to calculate, given the current $r_{33}$ values that are available, the index tuning that might be achieved with these designs. The most advanced polymers now yield $r_{33}$ values of 500 pm/V. If a bulk refractive index of 1.7 is used, then a $\partial n/\partial V$ of 0.006 $V^{-1}$ is obtained with the best design given above. Using a waveguide with an effective index of 2 and a group index of 3, which are typical of silicon-polymer nanoslot waveguides, the $V_\pi$ for a Mach-Zehnder with a length of 1 cm is expected to be about 6 mV. The resonance shift that is expected to be obtained in a ring resonator configuration would be 380 GHz per volt. Both of these values represent orders of magnitude improvement in the performance of these devices compared to current designs.

Segmented Contacting

As we have shown empirically, silicon can be doped to about 0.025 Ω-cm of resistivity with a n-type dopant without substantially increasing losses. Other dopants or perhaps other high index waveguiding materials may have even higher conductivities that can be induced, without significantly degrading optical performance. However, it is known that the conductivity cannot be increased endlessly without impacting optical loss.

This naturally presents a serious challenge for the issue of driving a slot waveguide of any substantial length. Consider a slot waveguide arm of length 1 mm, formed of our optimal design. The capacitor formed by the gap between the two electrodes is about 0.25 pF. The 'down the arm' resistance of the structure, however, is 4 MΩ. Therefore, the turn on time of an active waveguide based on this is about 0.1 μS, implying a 10 MHz bandwidth.

A solution to this problem is presented by continuously contacting the waveguide via a segmented waveguide. This comprises contacting the two silicon ridges with a series of silicon arms. Even though the silicon arms destroy the continuous symmetry of the waveguide, for the proper choice of periodicity no loss occurs, and the mode is minimally distorted. This is because a Bloch mode is formed on the discrete lattice periodicity, with no added theoretical loss. Of course the performance of fabricated devices will be different from that of conventional slot waveguides due to fabrication process differences. We have previously demonstrated empirically that continuous electrical contact can be formed for non-slotted waveguide via segmentation with relatively low optical losses.

Here we present a simulation of a particular segmentation geometry for our optimal slot waveguide design, that with 200 nm tall and 300 nm wide arms and a gap of 20 nm. We have found that a segmentation with 40 nm arms, and a periodicity of 100 nm, appears to induce no loss or significant mode distortion in the waveguide. Around 2 um of clearance appears to be needed from the edge of the segmented waveguide to the end of the arms. FIGS. 34A, 34B and 34C show plots of several cross sections of the segmented slot waveguide with a plot of the modal pattern overlaid. For comparison, a cross section of the unsegmented slot waveguide is presented as well. Simulations were also performed to confirm that the index shift formula continued to apply to the segmented slotted waveguide. It was found that the index shift was in approximate agreement with the value predicted for the non-segmented case. Non-segmented modesolvers were used for the rest of the simulations in this work, because simulation of the segmented designs is radically more computationally burdensome than solving for the unsegmented case, as they require solving for the modes of a 3d structure. Since the index shifts for the unsegmented and segmented cases are extremely similar, solving for the modes in the unsegmented cases is adequate for purposes of design and proof-of-concept.

Figure 15:
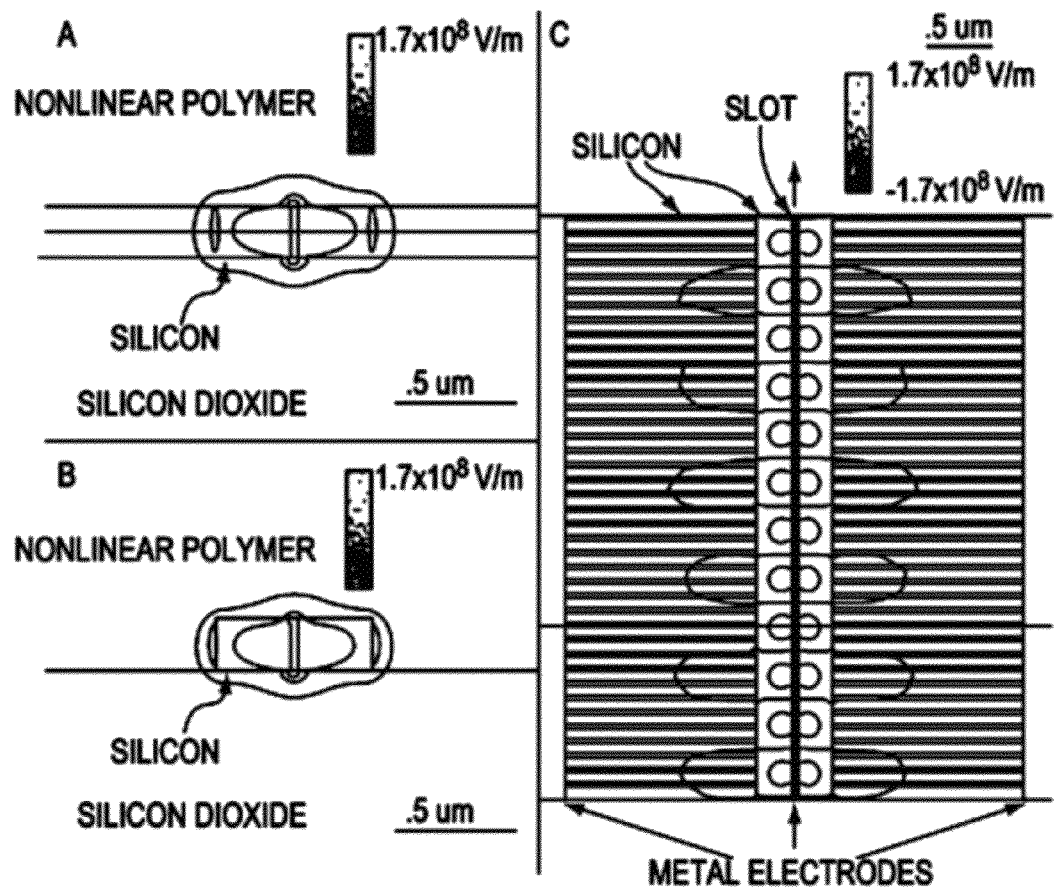
FIG. 15A shows a cross section of the segmented, slotted waveguide, with the |E| field plotted in increments of 10% of max value.
FIG. 15B shows a similar plot for the unsegmented waveguide.
FIG. 15C shows a horizontal cross section of the segmented, slotted waveguide in which Re(Ex) is plotted in increments of 20% of max.

FIG. 15A shows a cross section of the segmented, slotted waveguide, with the |E| field plotted in increments of 10% of max value. FIG. 15B shows a similar plot for the unsegmented waveguide. FIG. 15C shows a horizontal cross section of the segmented, slotted waveguide; Re(Ex) is plotted in increments of 20% of max. In an actual device, some sort of metal based transmission line would undoubtedly provide the driving voltage for the waveguide. The metal electrodes that would likely form part of this transmission line have been noted in FIG. 15C. In all cases the mode has been normalized to have 1 Watt of propagating power. FIG. 15A and FIG. 15C show the location of the other respective cross section as a line denoted C in FIG. 15A and A in FIG. 15C.

Assuming a 0.025 Ω-cm resistivity, one can calculate the outer arm resistance as 63 kΩ per side per period, while the inner arm resistance is 25 kΩ per side per period. The gap capacitance per period is $2.5 \times 10^{-17}$ Farads. This implies a bandwidth on the order of 200

We now describe an electro-optic modulator fabricated from a silicon slot waveguide and clad in a nonlinear polymer. In this geometry, the electrodes form parts of the waveguide, and the modulator driving voltage drops across a 120 nm slot. As a result, a half wave voltage of 0.25 V is achieved near 1550 nm. This is one of the lowest values for any modulator obtained to date. As the nonlinear polymers are extremely resistive, our device also has the advantage of drawing almost no current. It is believed that this type of modulator could operate at exceedingly low power.

A unique advantage with nonlinear polymers is that an integrated optical circuit can be conformally coated by a nonlinear polymer. This property, when combined with a slot waveguide, enables the construction of a uniquely responsive modulator. We describe the use of a push-pull Mach-Zehnder modulator configuration in which each arm has an opposing bias, leading to an opposing phase shift.

Figure 16:
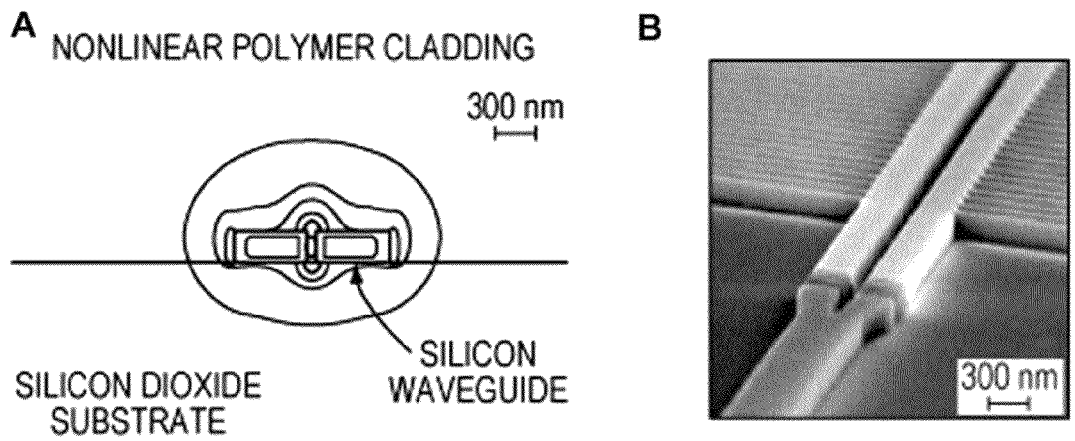
FIG. 16A is a diagram of the silicon slot waveguide used in the Mach-Zehnder modulator, according to principles of the invention.
FIG. 16B is an SEM micrograph of a slot waveguide, according to principles of the invention.

FIG. 16A shows the slot waveguide used for the Mach-Zehnder modulator. The modal pattern near 1550 nm is plotted, and contours of |E| are shown. FIG. 16B is an SEM micrograph of a slot waveguide. In this case, the slot waveguide is being coupled to with a ridge waveguide; this mode converter involves tiny gaps which ensure electrical isolation between the two arms. Contacting arms are also present around 3 μm from the ridge/slot junction. The dimensions are two 300×100 nm arms separated by a 120 nm slot.

Nonlinear polymers typically have very high resistivity of $10^{11}$ Ωcm. As a result, the two silicon arms are electrically isolated and can be used as modulator electrodes. The voltage drop between the arms occurs across a 120 nm electrode spacing, as opposed to the 5-10 μm that is typically required for modulators involving a nonlinear polymer and metallic contacts. This is a fundamental advantage that slot waveguide geometries have for electro-optic modulation.

It is advantageous to contact the silicon arms with an external electrode throughout the length of the Mach-Zehnder device to minimize parasitic resistances. We use a segmented waveguide in which a periodic set of small arms touches both waveguide arms. We use a segmentation with a periodicity of 0.3 μm and arm size of 0.1 μm that is largely transparent to the optical mode.

Figure 17:
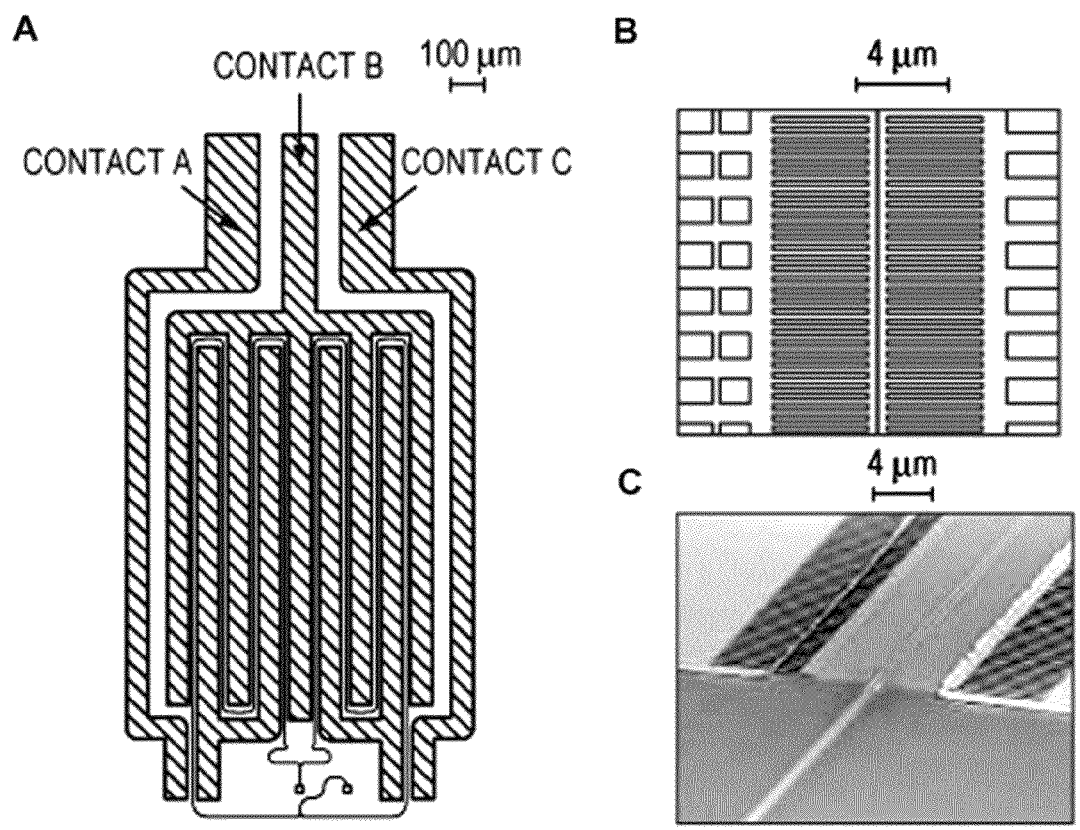
FIG. 17A is a diagram of the modulator layout, according to principles of the invention.
FIG. 17B and FIG. 17C are two SEM micrographs of modulators constructed according to principles of the invention, that show the slotted, segmented region, as well as the location where the silicon makes contact with the electrical layer.

Because the polymer has a second order nonlinearity, a Mach-Zehnder modulator can be operated in push-pull mode, even with no dc bias, effectively doubling the modulator response. FIG. 17A is a diagram of the modulator layout, in which contacts A, B, and C are shown. FIG. 17B is a diagram and FIG. 17C is a SEM micrograph that show the slotted, segmented region, as well as the location where the silicon makes contact with the electrical layer.

Referring to FIG. 17A, there are three regions in the modulator that are capable of maintaining distinct voltages. During poling operation, contact A is given a voltage of $2V_{pole}$, contact B a voltage of $V_{pole}$, and contact C is held at ground. To achieve a poling field of 150 V/μm, $V_{pole}$ was 18 V. This has the effect of symmetrically orienting the polymer in the two Mach-Zehnder arms. During device operation, contact B is driven at the desired voltage, while contacts A and C are both held at ground, leading to asymmetric electric fields in the two arms for a single bias voltage. This is the source of the asymmetric phase response. Electrical regions A and C cross the waveguide by means of a slotted ridged waveguide. At the ridge to slot mode converter, a small gap is left that maintains electrical isolation but is optically transparent. This enables the device to be built without requiring any via layers. A driving voltage from a DC voltage source was applied to contact B, while contacts A and C were held at ground.

Figure 18:
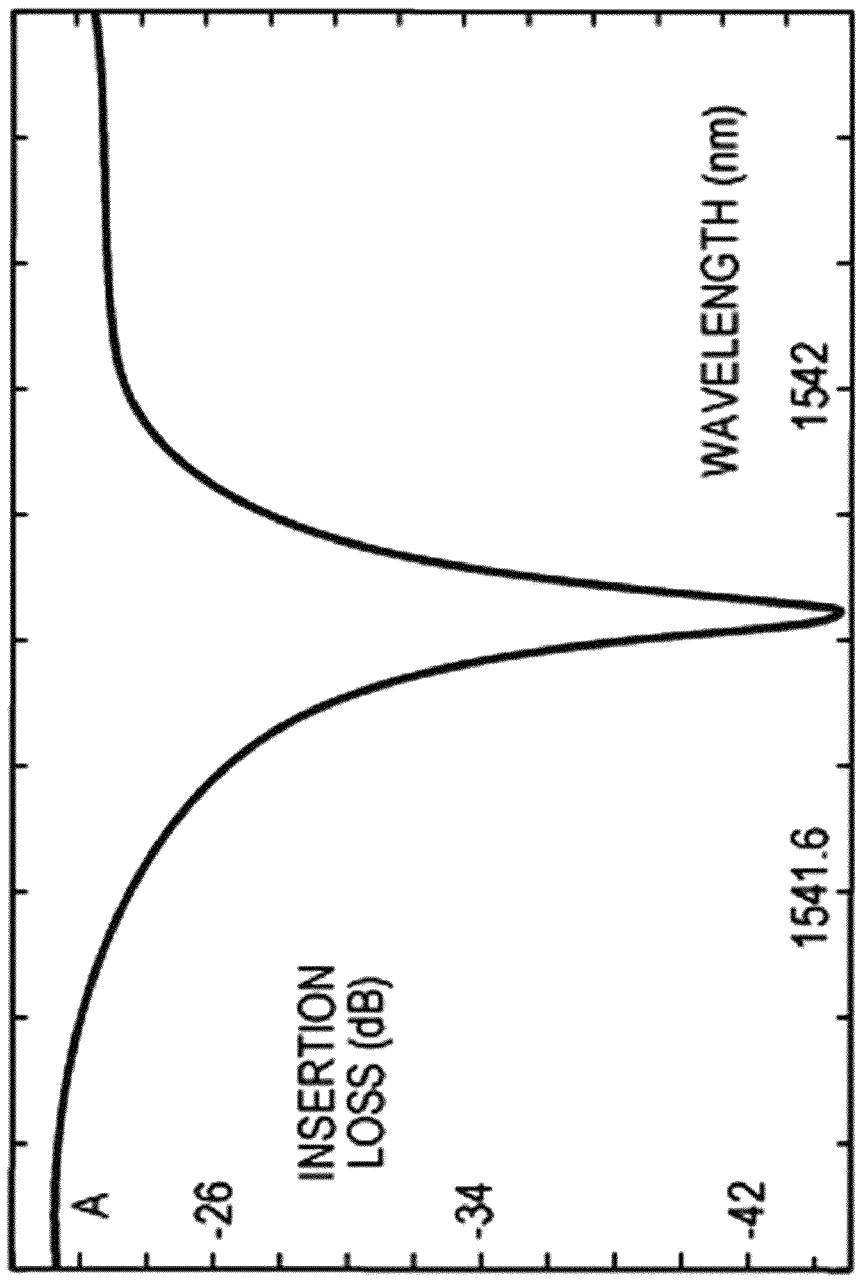
FIG. 18 is a diagram that shows a transmission spectrum of an electroded slot waveguide resonator with a gap of 70 nm. Fiber to fiber insertion loss is plotted in dB, against the test laser wavelength in nm.

We have recently demonstrated empirically that slot sizes of around 70 nm can be fabricated in 110 nm SOI as ring resonators with electrical contacts. FIG. 18 is a diagram that shows a transmission spectrum of an electroded slot waveguide resonator with a gap of 70 nm. Fiber to fiber insertion loss is plotted in dB, against the test laser wavelength in nm. We have also confirmed through electrical measurements that the two halves of the slots are largely electrically isolated.

We believe that there is the possibility of constructing even narrower slot waveguides, on the scale of 1-5 nm in thickness. For example, one could use epitaxial techniques to grow a horizontal slot structure (rather than the vertical structures we have explored thus far) with an active, insulating material, with silicon beneath and above. This could be done in a layer form analogous to SOI wafer technology, in which a very thin layer of electroactive material such as the polymers we have described herein could be introduced. Such structures offer the possibility of yet another order of magnitude of improvement in the low-voltage performance of modulators. We anticipate our slot structures to be fairly robust even in the presence of fabrication errors. Fabrication imperfections may cause some of the narrower slots to have tiny amounts of residual silicon or oxide in their centers, or to even be partially fused in places. As long as electrical isolation is obtained, and the optical loss is acceptable, we would expect the slot performance to decrease only in a linear proportion to the amount of the slot volume that is no longer available to the nonlinear polymer cladding.

The description provided herein may be augmented by the descriptions provided in the following patents and pending patent applications: U.S. Pat. Nos. 7,200,308, 7,424,192, U.S. Patent Application Publication No. 2009/0022445A1, U.S. patent application Ser. No. 12/167,063, PCT/US2009/33516, and PCT/US2009/36128.

Detecting the presence, intensity and frequency of optical radiation is an important part of many optical systems, which include communications, detection and imaging systems. In the visible and near infrared, detection is often achieved by means of a semiconductor that creates an electron and hole in response to an optical signal. See for example Yariv, A. *Optical Electronics in Modern Communications* (Oxford University Press, Oxford, 1997). In other frequency regimes, such as radiation with a 10 micrometer free space wavelength, detection is more difficult.

We present here a fundamentally new approach to detection, which involves using the electric field from either RF or optical radiation to alter the refractive index of a nonlinear optical material. A common type of nonlinear optical material is a material with a second order nonlinearity. In other embodiments, materials with third order nonlinearities can also be used, especially in conjunction with a high DC field. Such materials are described hereinabove and in PCT/US09/36128.

Integrated optical detection based on optical rectification has been recently demonstrated and is described hereinabove and in PCT/US2009/036128. In some embodiments, a second order nonlinear optical material is used to convert radiation at an optical frequency into radiation at RF frequencies. Such a detection scheme has several advantages. First, it is expected to offer extremely high bandwidth, since the optical nonlinearity on which it is based occurs at the optical frequency. Second, the linearity of such a detector may be very good, since it does not rely on a free carrier or semiconductor junction based process.

The purpose of a photodetector is to gather optical energy at a certain range of frequencies, and exhibit an electrical response to the incident optical radiation. The electrical response can be a photocurrent, that is, a current that is induced by the presence of optical radiation. The electrical response can then be used as input to a data processing circuit. Photodetectors form an important part of most modem communications systems.

One important characteristic of a photodiode is the peak operating speed that the photodiode van provide. In some photodetectors, the speed is limited by the physical size of the photodetector. One reason for this is the length of time it may take carriers to diffuse across the photodetector in the case of a semiconductor based photodetector. Another cause is the fact that there is a shunt capacitance associated with most photodetectors, which is proportional to photodetector area and can also limit speed.

We present a method for increasing the peak operating speed by means of a high index contrast waveguide, which can focus incident radiation into a small area. This enables the photodetector to function at a more rapid rate. This waveguide can be coupled to the outside world through any of several methods, including grating coupling, edge coupling, and butt coupling to a fiber.

Slot-Waveguide Based Nonlinear Polymer Modulators

Figure 19:
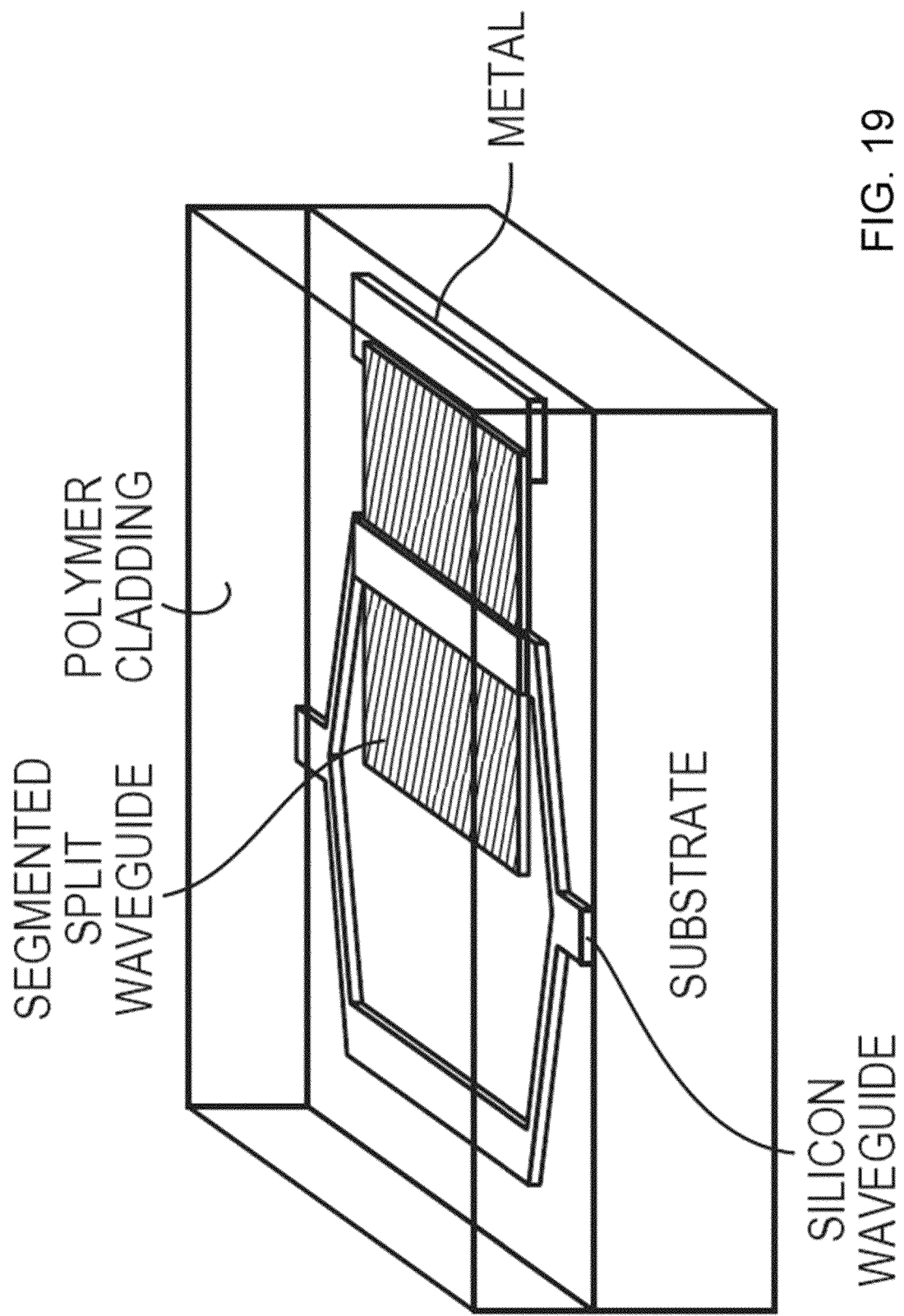
FIG. 19 is a three dimensional, isometric schematic of a slot-waveguide modulator, showing the slot waveguide, segmentation region and metal contacts. The device illustrated in FIG. 19 functions by maintaining the two arms of the slot waveguide at differing voltages, creating a strong electric field in the slot.

Recently, slot waveguides with a second-order nonlinear optical material, electro-optic polymers, have been used to build exceptionally low drive voltage modulators, as described hereinabove. The exceptionally low drive voltage required dramatically changes the amount of power needed to greatly alter the flow of RF radiation. The electro-optic effect for these materials does not change at much higher frequencies, even frequency regimes typically thought of as being in the optical or mid to near-infrared regime. FIG. 19 shows a diagram of a slot waveguide modulator.

The phase shift that is created by an electric field can be enhanced, by using one or both of the geometric enhancement and the recent material enhancements available nonlinear electro-optic polymers, and possibly other materials that exhibit appreciable non-linear coefficients.

Detection Based on Optical Phase Shift

A detector can be constructed that employs the enhanced phase shift that an electric field can induce in a waveguide with a nonlinear material. This electric field can be caused by electromagnetic radiation selected from by any of an RF, mm wave, infrared or optical radiation. In some embodiments, the detector functions by application of a Mach-Zehnder geometry. The incident electric field induces a phase shift on each arm, and with the proper arrangement of the nonlinear material, the phase shift on each arm can be in the opposite direction for the desired input electromagnetic mode that is to be detected. A continuous wave detector wavelength is directed into the input of the waveguide. As a result of the phase shift due to the mode that is to be detected, the Mach-Zehnder's optical output will change in intensity, and the detector wavelength will acquire an intensity modulation. This intensity modulation can then be detected in a conventional photodetector or optical signal detector, as the detector wavelength can be chosen to be a wavelength at which detection can be achieved conveniently. In some embodiments, the optical signal detector is integrated on the same substrate as the Mach-Zehnder interferometer. In other embodiments, the optical signal detector is provided as a separate component that is optically couples to the output of the Mach-Zehnder interferometer.

Figure 20A:
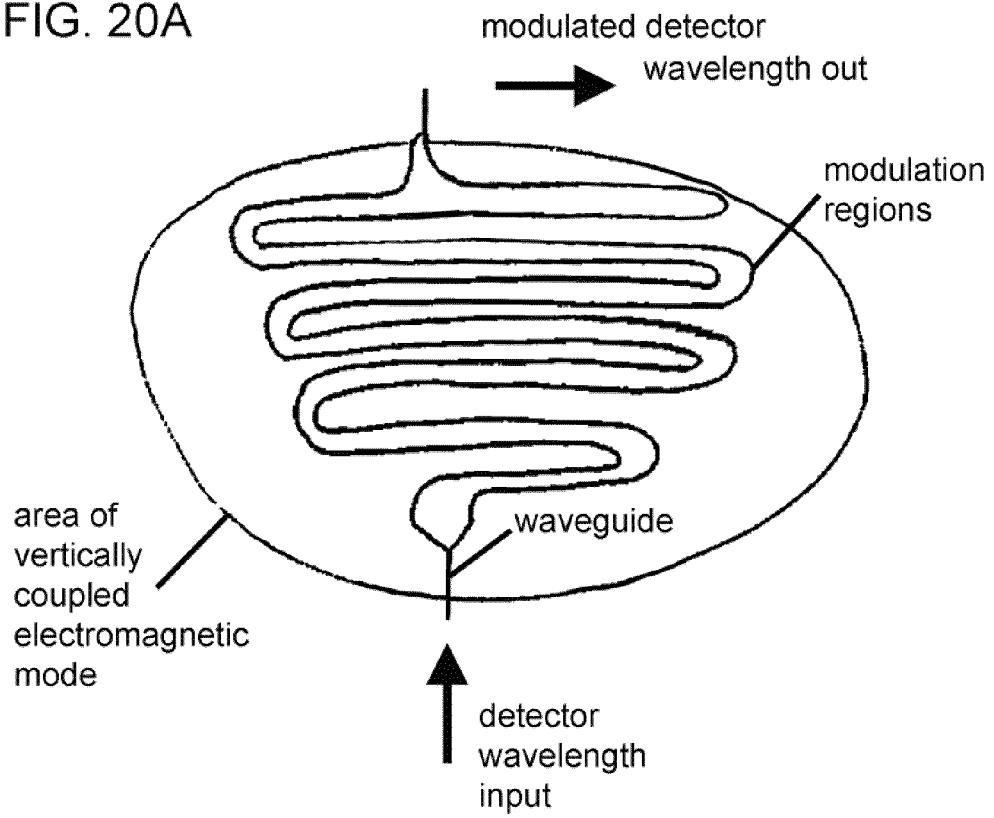
FIG. 20A is a plan diagram that shows the geometry of an illustrative detector based on a nonlinear phase shift in a Mach-Zehnder interferometer.
Figure 20B:
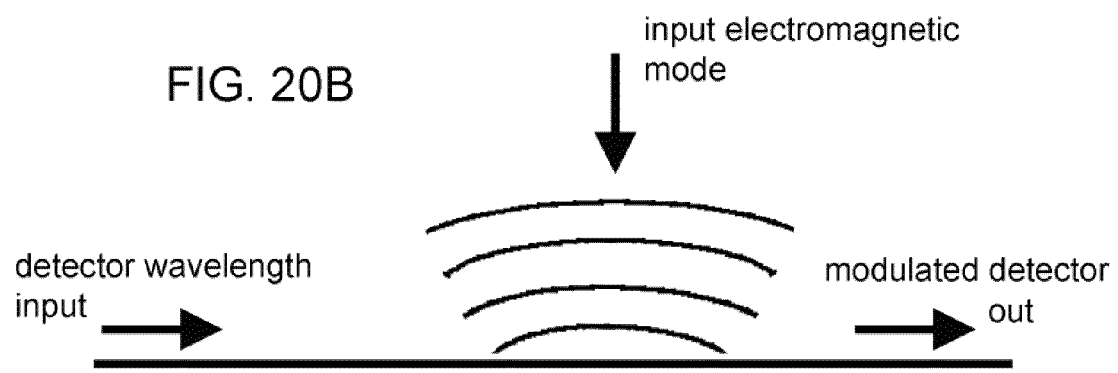
FIG. 20B is an elevation diagram that shows the geometry of an illustrative detector based on a nonlinear phase shift in a Mach-Zehnder interferometer.

FIG. 20A is a plan diagram that shows the geometry of an illustrative detector based on a nonlinear phase shift in a Mach-Zehnder interferometer. As seen in FIG. 20A, the arms of the Mach-Zehnder interferometer are constructed as a serpentine structure to increase the length of the Mach-Zehnder interferometer that is subjected to an electromagnetic field, for example from incoming electromagnetic radiation. This detector is designed for input from a vertically coupled electromagnetic mode, which can be an RF frequency mode, or a mode in the optical domain. The waveguide is expected to be built in a planar integrated optical platform, such as a Silicon-On-Insulator (SOI) wafer. FIG. 20B is an elevation diagram that shows the geometry of an illustrative detector based on a nonlinear phase shift in a Mach-Zehnder interferometer. The relationship between the geometry of the Mach-Zehnder interferometer and the applied electromagnetic field is made evident in FIG. 20B. As illustrated in FIG. 20A and FIG. 20B, the detector has an input port where an input signal comprising a component at the detector wavelength is provided, and an output port where an output signal comprising the modulated detector wavelength component exits the modulator. The output signal is conveyed to an optical signal detector (not shown) where the modulated detector wavelength component is detected, thereby providing a measure of the input electromagnetic radiation that is desired to be detected. The output of the optical signal detector can be measured, displayed, recorded or otherwise subjected to further processing.

It might at first seem odd that both arms of the Mach-Zehnder are exposed to the incident beam. One arm can be engineered to exhibit a positive shift in index of refraction, and therefore a positive phase shift, and the other arm a negative shift, by means of controlling the directionality of the nonlinear optical material. For a second order nonlinear material, this can be accomplished by poling the material with alternate polarities with respect to the incident radiation. For third order nonlinear materials, this can be accomplished by applying a DC electric field directed in opposite directions on each arm.

In some situations, it might not be desirable to perform a measurement of the intensity of the output optical signal. This can be due to the fact that the frequency of the signal that is to be detected is too high for conventional photodetection. In this case, a frequency filter in the optical domain can be used with the detector wavelength output. The phase shift that is created in the Mach-Zehnder will create sidebands around the detector optical signal. That is, if the frequency of the signal to be detected is $w_0$, and the detector wavelength is at a frequency $w_d$, then optical energy near the detector wavelength would be found at the sum and the difference frequencies, or at $w_d - w_0$, and $w_d + w_0$. This optical energy would be close to the detector wavelength in frequency, because in the typical application, the detector wavelength will have a much higher frequency than the wavelength to be detected. As a result, all of $w_d$, $w_d-w_0$, $w_d+w_0$, and any other sidebands that are created can be guided in the waveguide.

The height and precise locations of the optical energy at $w_d-w_0$, $w_d+w_0$, and the other sidebands will provide information about the input electromagnetic mode signal to be detected. Both the intensity and frequency can be derived in this fashion, through any number of approaches. It may not be necessary to use a Mach-Zehnder geometry if one does not intend to detect an intensity modulation, but rather the detector will operate by detecting the sidebands. This is because the sidebands near the detector wavelength can be created solely by phase shifts.

Another type of detector with similar properties can be constructed by using a conventional Mach-Zehnder travelling wave modulator. Usually, such devices are not thought of as being good detectors, since the voltages required to get significant swing in the optical output powers are fairly high. However, if these voltages can be lowered by many orders of magnitude, as is described hereinabove, the Mach-Zehnder can become a detector as well. In fact, such a detector is expected to be especially useful for applications that involve sensing low-level RF signals in PCB probing applications, and in applications that involve sensing very small low frequency (DC-100 GHz) signals. An important advantage of the geometry presented in FIG. 20, however, is that it is not necessary to build a travelling wave geometry, and so the detector can function at wavelengths at which a low loss RF-like waveguide cannot be built.

Furthermore, connecting a low-Vpi modulator to an inductor will provide an extremely sensitive detector for magnetic fields, which can easily be utilized to detect displacement relative to an external magnet.

Scaling Law and Sensitivity

We can define sensitivity as the amount of shift that occurs in the optical output as a function of input radiation. The precise sensitivity will depend on the particular geometries involved. Nevertheless, one can make some broader statements that are independent of the particular mechanisms involved for the geometry presented in FIG. 20A and FIG. 20B. The magnitude of the peak electric field of the signal that is to be detected will be inversely proportional to the square root of the area of the detector, according to:

$$E \propto 1/\sqrt{A} \qquad (3)$$

The length of waveguide that can be fit into the detector area is proportional to the area according to:

$$L \propto A \qquad (4)$$

This is due to the fact that a certain amount of lateral clearance between waveguide sections is required.

The phase shift that will result from a given amount of input power is proportional to the electric field times the length of the waveguide, according to:

$$\Delta\phi \propto LE \qquad (5)$$

The phase shift will be directly proportional to the strength of the optical output signal. As a result, the phase shift will be proportional to the square root of the area, according to:

$$\Delta\phi \propto \sqrt{A} \qquad (6)$$

This suggests that the sensitivity of a detector operating according to these principles can be greatly increased by increasing the area. Another implication is that the amount of output optical power will depend on the square root of the input power, according to:

$$P_{output} \propto \sqrt{P_{input}} \qquad (7)$$

This suggests that the detector can be made to work at exceedingly low input powers, since a reduction in input power by a factor of 10 only causes a reduction by a factor of around 3.16 in detector response.

Phase-Matching Conditions and Frequency Selectivity

The time that it takes the detector wavelength to propagate through the entire detector device shown in FIG. 20A and FIG. 20B can be much shorter than the characteristic oscillation at the frequency of the incident radiation. This is expected to be true in the case of RF input radiation, and a relatively small area. However, it is also possible that the travel time for the detector wavelength will be longer than a characteristic oscillation of the input radiation that is to be detected.

This circumstance presents both a challenge and an opportunity. The nonlinear material is likely to need to be periodically poled to prevent the phase shift that is being built up from getting washed out by the changing polarity of the field of the mode to be detected. The need to perform poling will complicate the design somewhat. However, this phase matching requirement also has the benefit of making the detector intrinsically frequency selective. Moreover, it is possible to tune this frequency selectivity during detector operation by controlling the phase delay between different, nonlinear material polarities.

Figure 21:
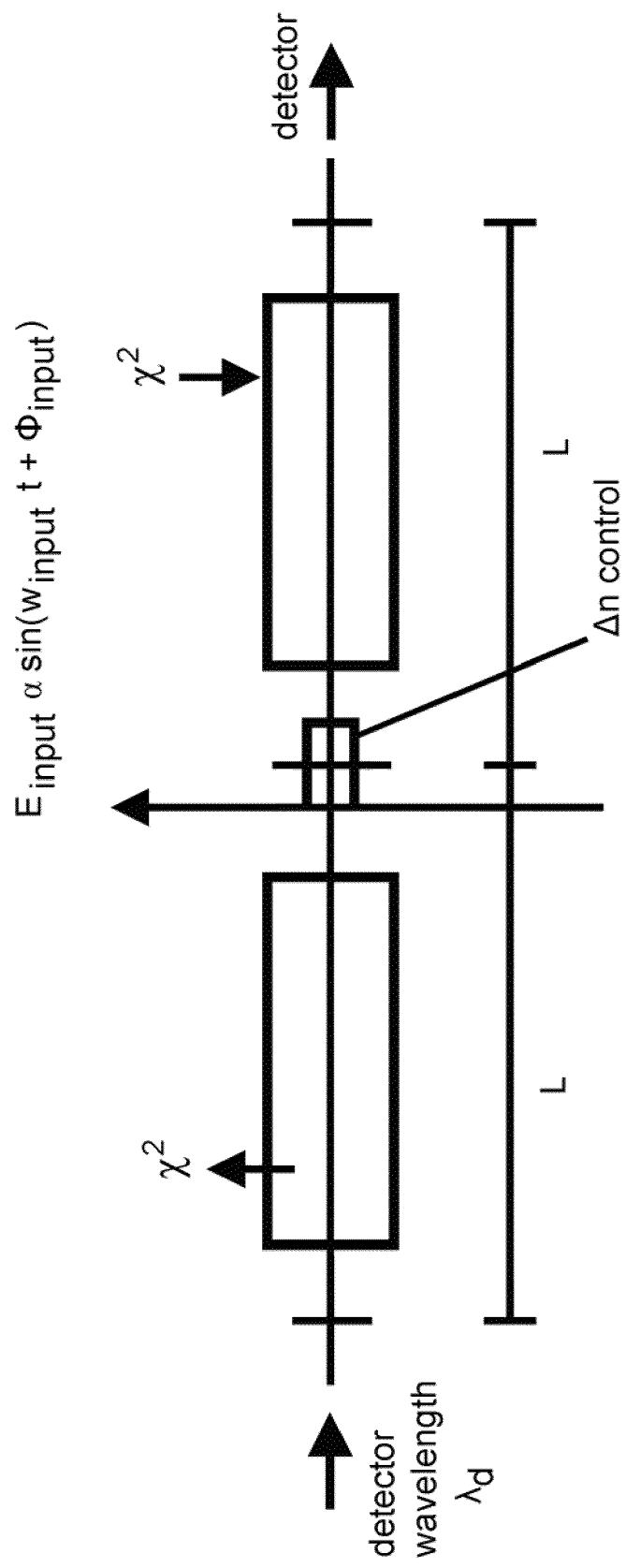
FIG. 21 is a diagram that shows a portion of the nonlinear waveguide that forms an arm of the Mach-Zehnder modulator, or part of a phase shift modulator.

FIG. 21 is a diagram that shows a portion of the nonlinear waveguide that forms an arm of the Mach-Zehnder modulator, or a part of a phase shift modulator. In this embodiment, a second order nonlinear material is used, which is periodically poled with period length 2L. The direction of the E field due to the incident electromagnetic mode that is to be detected is also indicated by $E_{input}$. The polarity of this electric field changes at the frequency of the input radiation, and this change preferably should be matched with a change in the polarity of the nonlinear material. $E_{input}$ is proportional to $\sin(w_{input}+\Phi_{input})$. In FIG. 21, the difference in poling between the $\chi^2$ material in one portion of the modulator and the $\chi^2$ material in another portion of the modulator is illustrated by the upward arrow on the left and the downward arrow on the right.

The length L is determined by:

$$L = \left(\frac{T_{input}}{2}\right)\left(\frac{c}{n_{det}}\right) \qquad (8)$$

Here $T_{input}$ is the period of the input radiation that is to be detected, and $n_{det}$ is the effective index of the detector wavelength in the waveguide. The effective index, however, can be controlled by a slow electrooptic modulation mechanism, $\Delta n$ control, such as free carriers in silicon. As a result, the frequency to which the detector is sensitive can be changed in real-time, and all other frequencies can be discarded. This frequency tuning has the effect of removing a great deal of the noise that the detector might otherwise pick up, and can make the detector more sensitive in certain situations.

Figure 22A:
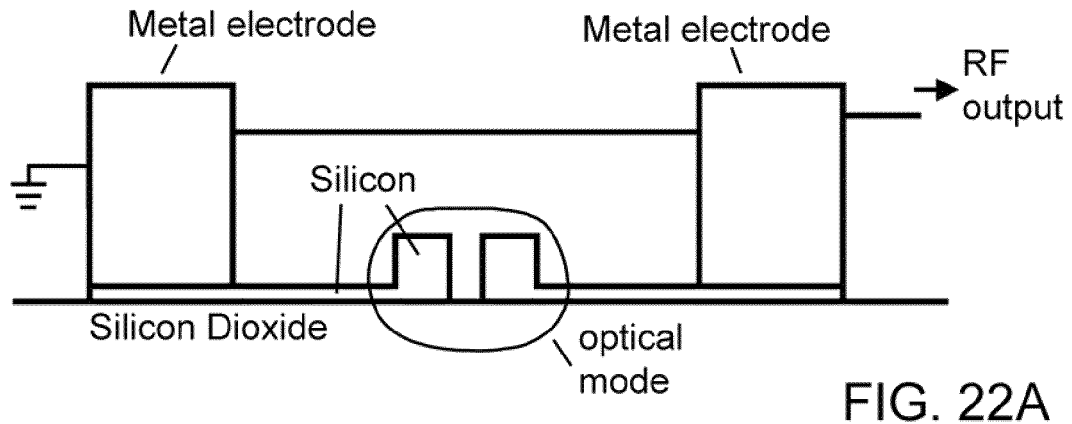
FIG. 22A shows the detector in elevation.
Figure 22B:
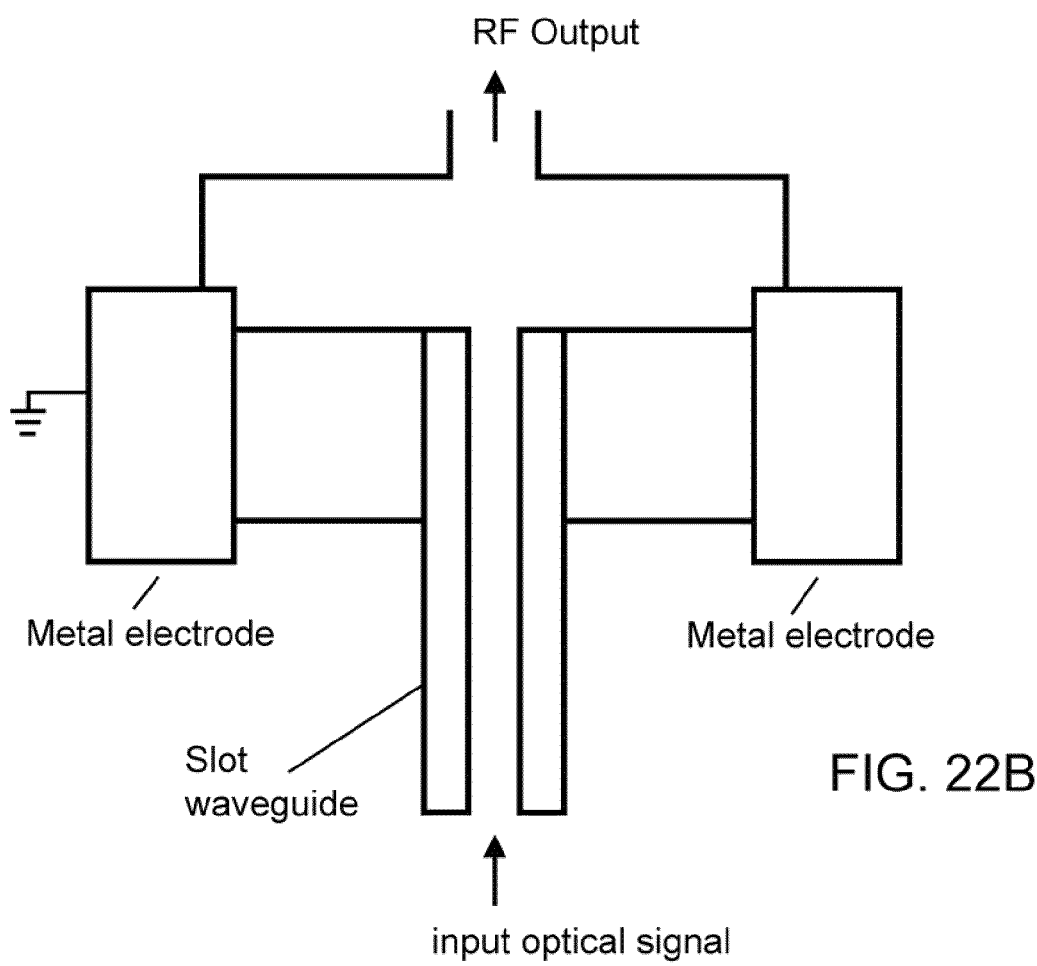
FIG. 22B shows the detector in a plan diagram.

Turning now to FIG. 22, there is shown a diagram of a realization of an optical rectification based detector. In this case, a nonlinear polymer and slot waveguide are used, similar to the approaches described hereinabove.

An incoming optical signal causes the nonlinear polymer located in the slot of the waveguide to generate an RF electric field, which is then guided by the silicon and metal electrodes into the RF output. The silicon slot waveguide can be connected to the metal electrodes either through a thin layer of silicon with a strip loaded waveguide, or through segmented waveguides, as shown hereinabove in FIG. 15.

Boost Optical Mode Enhancement

The optical rectification detector can be enhanced by the addition of a second "boost" optical signal to greatly increase the responsivity of the detector. Consider an optical signal that is to be detected at wavelength $\lambda_0$ and a second boost optical mode at wavelength $\lambda_1$. For near infrared radiation, one might consider having $\lambda_0$ at 1550 nm and $\lambda_1$ at 1551 nm. In most cases, $\lambda_0$ will comprise an intensity modulation component. It is desirable to detect this modulation for as low a power of wavelength $\lambda_0$ as possible. However, this approach is not limited to any particular wavelength. If a nonlinear material can be found with a suitable nonlinear coefficient at a wavelength of interest, and waveguiding is achieved, then this detection approach can be used.

Figure 23:
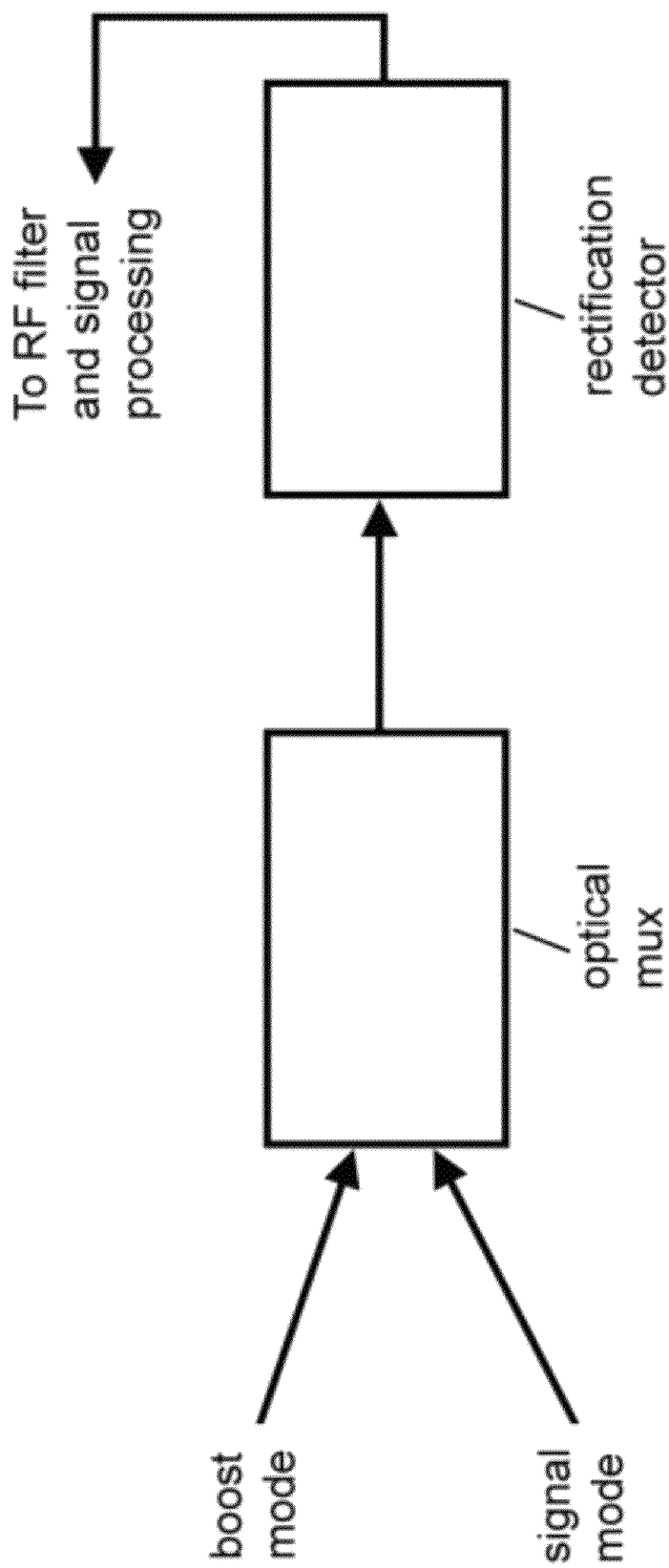
FIG. 23 shows a logical diagram of boost mode enhanced optical rectification detector, in which a high power CW boost mode is combined with the optical signal that is to be detected.

The boost mode and the signal mode will be mixed by the nonlinear optical material, and produce an RF output signal at the difference frequency between the two optical modes. The difference frequency is widely tunable, since the frequency range over which lasers can be tuned is typically quite large. For the previous examples of 1550 nm and 1551 nm, the difference frequency would be approximately 100 GHz. An output RF signal at this frequency would be produced by the nonlinear optical material. In addition, this RF signal would have an intensity modulation determined by the intensity modulation on the optical signal. FIG. 23 shows a logical diagram of the boost optical mode enhanced optical rectification detector, in which a high power CW boost mode is combined with the optical signal that is to be detected. As shown in FIG. 23, there is an input port for the boost mode signal and an input port for the signal mode signal. The two signals are combined in an optical multiplexer (or mux). The combined signals are subjected to detection in a rectification detector and the difference signal is detected, with the application of filtering and signal processing to determine the characteristics of the signal mode signal of interest.

Once the signal is in the RF domain, there are a number of other mechanisms that can be used to effectively detect it. In addition to RF frequencies near the difference frequency signal, there will be RF energy at lower frequencies from the boost optical mode being rectified against itself, as well as at the frequency at which the signal intensity modulation is occurring. Due to the large differences in RF frequency, however, it is expected that it will be easy to filter this out using well-known high frequency signal processing techniques.

Furthermore, it will be possible to identify the frequency of the signal mode relative to the boost mode, based on the frequency of the output. By way of example, if the boost mode is locked to a frequency standard, this approach can provide the basis of an extremely sensitive spectrometer.

For an unenhanced optical rectification detector, the output RF signal will have an amplitude, or voltage, that is proportional to the square of the optical electric field from the signal optical mode, given by the following relationship:

$$V_{RF} \propto E_{signal}^2 \quad (9)$$

Furthermore, according to equation (9), if the signal of interest decreases by a factor of 2, the RF voltage will only decrease by a factor of $1/\sqrt{2}$. This suggests that the detector will retain its sensitivity for even extremely small signal powers.

For a boost optical mode enhanced detector, the RF voltage will be proportional to:

$$V_{RF} \propto E_{signal} E_{boost} \quad (10)$$

The scaling relation of equation (10) has several advantageous properties. One consequence of equation (10) is that increasing the boost optical mode energy causes the output RF energy to increase, even in the absence of any increase in the signal optical mode. This enables an amplification of the detector's response by an increased boost signal level, even when the signal of interest does not increase. The boost signal operates as a multiplier for the signal, so that one can scale the output voltage by using a selected boost signal amplitude.

Unfortunately, equation (10) does not preserve linearity in the input signal, in terms of RF amplitude. However, the functional relation in equation (10) will likely stay the same for a very large variation in signal power, which is expected to be very valuable. Furthermore, according to equation (9), if the signal of interest decreases by a factor of 2, the RF voltage will only decrease by a factor of $1/\sqrt{2}$. This suggests that the detector will retain its sensitivity for even extremely small signal powers.

This technique is expected to be particularly useful for constructing sensitive detectors for optical frequencies in the mid-infrared and longer.

Conventional Photodiodes

A conventional photodiode operates by exposing a photosensitive material to an incident optical beam. Often, the optical input is fiber or even free space coupled. That implies that the area of the photodiode should be large enough to capture the lateral dimensions of the beam. It is possible to focus the beam with a lens, but this process can only reduce the lateral sizes of the beam to a few micrometers under the best of conditions.

Figure 24:
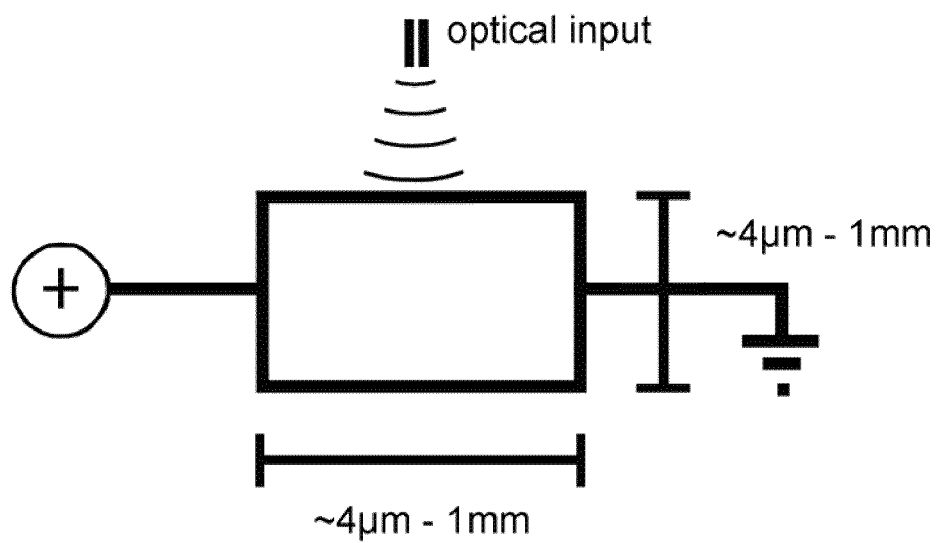
FIG. 24 is a diagram of a conventional photodetector.

FIG. 24 is a diagram of a conventional photodetector. Optical radiation emerges from a fiber or free space, and falls on a large area of photosensitive material. For radiation near 1.55 μm free space wavelength, the optically active area may range from 4×4 μm for very high speed devices to a much larger size, perhaps 1 mm×1 mm or more.

Grating Coupler Enhanced Photodetector

The optical radiation falling on a photodetector often has a particular modal form. It is usually a Gaussian beam, with a spot size that is often fairly well known. In fact, for a single mode fiber input, if the polarization state is known, then the output modal form of the optical mode will be known nearly exactly.

Figure 25:
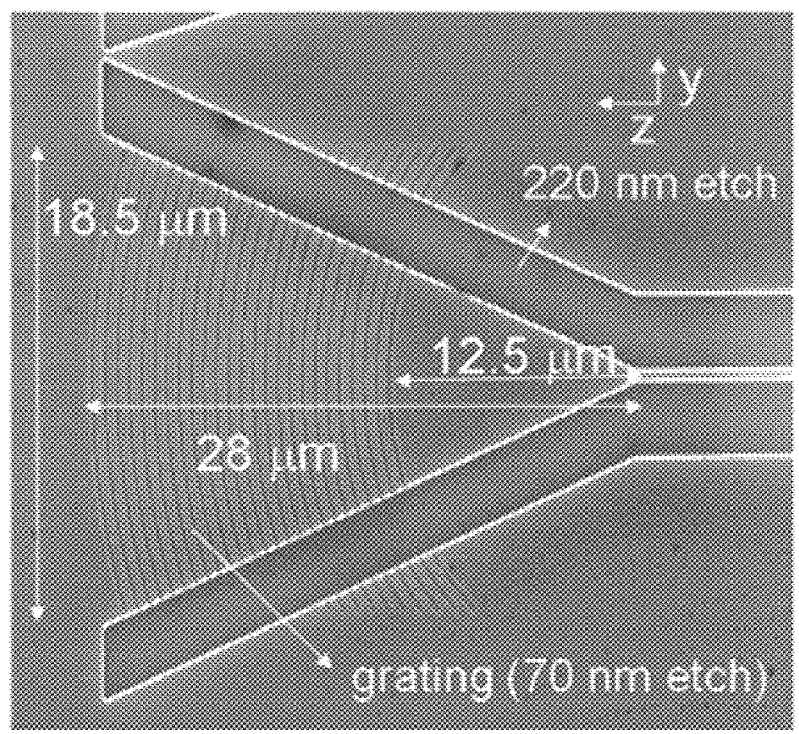
FIG. 25 shows an SEM image of a fabricated grating coupler, realized in Silicon-On-Insulator with a 110 nm thick silicon layer.

Grating couplers are devices defined by a pattern of ridges or trenches. The ridges or trenches are provided in a pattern of scattering sites which can coherently scatter optical radiation from a waveguide into a vertically coupled Gaussian beam. The reverse operation is also possible. Optical radiation in the form of a Gaussian beam with a fairly wide spot size that is incident on the grating coupler can be guided into a waveguide. When a high index contrast material system is used, such as a system based on etched Silicon-on-Insulator clad with air and silicon dioxide, the guided optical mode in the waveguide can have lateral dimensions on the order of 0.5 micrometers or less. FIG. 25 shows an SEM image of a fabricated grating coupler, realized in Silicon-On-Insulator with a 110 nm thick silicon layer. Such a grating coupler can guide light with a free space wavelength near 1.55 micrometers into a very compact waveguide mode in a waveguide of 110×500 nm, with lateral dimensions for the optical mode on the order of 0.5 micrometers or less.

In one embodiment, an enhanced photodetector includes a grating coupler, which collects a beam and guides it into a waveguide. The waveguide is attached to or communicates optically with an integrated photodetector. One approach to achieve such a photodetector for radiation near 1.55 micrometers is by use of deposited germanium (Ge). Another approach is to use damaged silicon.

Figure 26A:
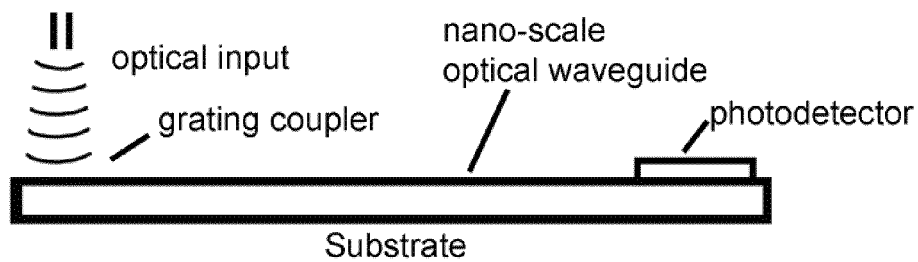
FIG. 26A is a diagram in elevation of a photodetector comprising a grating coupler.
Figure 26B:
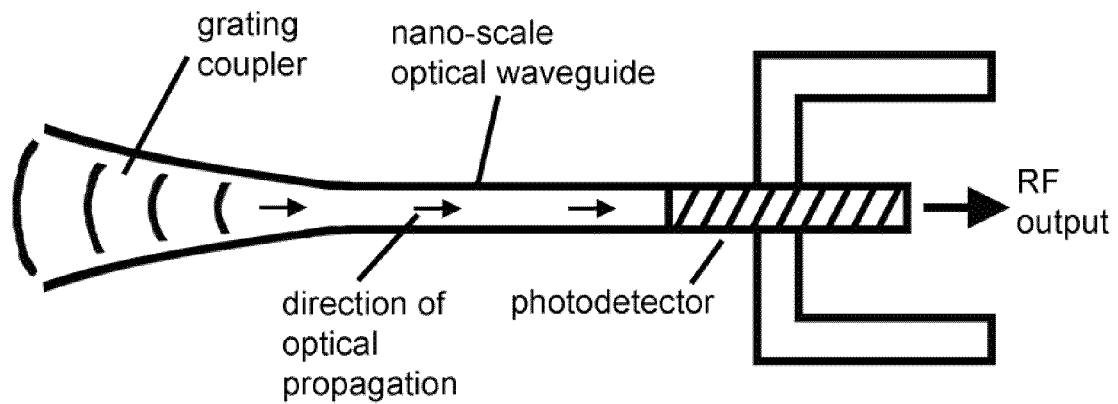
FIG. 26B is a plan diagram of the photodetector comprising a grating coupler.

FIG. 26A is a diagram in elevation of a photodetector comprising a grating coupler. FIG. 26B is a plan diagram of the photodetector comprising a grating coupler. The extremely small area required for the photodetector as a result of the focusing provided by the grating coupler is expected to allow for exceptionally quick response times.

Enhanced photodetectors will have lower response times, and therefore have more bandwidth. It is possible that higher speed communications systems can be built on the basis of devices such as this.

The invention comprises three cooperating components: A coupler to the outside world, a nanoscale waveguide which concentrates light into a very small area, and a photodetector which takes advantage of this small area in order to function at extremely high speed.

These detector devices can be constructed in an array (such as a 1 or 2 dimensional array), in order to provide high-bandwidth free space coupled image sensors.

As described in greater detail herein, the present invention provides methods and structures that exhibit enhancement of the nonlinear effects in various electro-optical materials that is sufficient to make the nonlinear effects accessible with continuous-wave, low-power lasers. As is described herein the waveguide is coated or clad with another material which provides or exhibits an enhanced nonlinear optical coefficient, such as certain kinds of organic electro-optical materials that can be specifically designed to operate in various regions of the electromagnetic spectrum. It is to be understood that if the high contrast waveguide core material itself exhibits a sufficiently large nonlinear optical coefficient of the correct order, for example, a $\chi^2$ or a $\chi^3$ coefficient, the cladding may be omitted and the waveguide core itself can provide the nonlinear optical effects of interest.

DEFINITIONS

As used herein, the term "observe" will be understood to include any of the terms "measure," "display," "record," or their synonyms or derivatives. Recording the results from an imaging operation or image acquisition, such as for example, recording results at a particular wavelength, is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example an imaging or image processing algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A detector for electromagnetic radiation, comprising:
    a silicon-on-insulator wafer substrate having a surface;
    a waveguide comprising a material configured to exhibit a nonlinear optical coefficient adjacent said surface of said substrate, said waveguide fabricated in said silicon on said insulator of said silicon-on-insulator wafer, said waveguide having an input port configured to receive an optical signal having a first wavelength as an input optical signal, and an optical output port configured to provide a modulated optical signal as an output optical signal, said waveguide further configured to receive electromagnetic radiation to be detected;
    said waveguide configured to modulate said input optical signal having said first wavelength in response to received electromagnetic radiation to be detected and to provide said modulated optical signal as said output optical signal; and
    a optical signal detector configured to detect optical signals having said first wavelength, and configured to provide an output indicative of said received electromagnetic radiation to be detected.

2. The detector for electromagnetic radiation of claim 1, further comprising a grating coupler for coupling said electromagnetic radiation to be detected to said waveguide.

3. The detector for electromagnetic radiation of claim 1, wherein said waveguide is a slot waveguide.

4. The detector for electromagnetic radiation of claim 1, wherein said electromagnetic radiation to be detected comprises a selected one of RF, mm wave, infrared and optical radiation.

5. The detector for electromagnetic radiation of claim 1, wherein said output indicative of said received electromagnetic radiation to be detected comprises a selected one of a detection of a presence, a detection of an intensity, and a detection of a frequency of said received electromagnetic radiation to be detected.

6. The detector for electromagnetic radiation of claim 1, wherein said waveguide is a high index contrast waveguide.

7. The detector for electromagnetic radiation of claim 1, further comprising a cladding comprising a material that exhibits a nonlinear optical coefficient.

8. The detector for electromagnetic radiation of claim 7, wherein said cladding comprising a material that exhibits a nonlinear optical coefficient is a material exhibiting a $\chi^2$ coefficient.

9. The detector for electromagnetic radiation of claim 8, further comprising electrodes for poling said material exhibiting a $\chi^2$ coefficient.

10. The detector for electromagnetic radiation of claim 7, wherein said cladding comprising a material that exhibits a nonlinear optical coefficient is a material exhibiting a $\chi^3$ coefficient.

11. A method of detecting electromagnetic radiation, comprising the steps of:
    providing a detector of electromagnetic radiation comprising:
        a silicon-on-insulator wafer substrate having a surface;
        a waveguide comprising a material configured to exhibit a nonlinear optical coefficient adjacent said surface of said substrate, said waveguide fabricated in said silicon on said insulator of said silicon-on-insulator wafer, said waveguide having an input port configured to receive an optical signal having a first wavelength as an input optical signal, and an optical output port configured to provide a modulated optical signal as an output optical signal, said waveguide further configured to receive electromagnetic radiation to be detected;
        said waveguide configured to modulate said input optical signal having said first wavelength in response to received electromagnetic radiation to be detected and to provide said modulated optical signal as said output optical signal; and
        a optical signal detector configured to detect optical signals having said first wavelength, and configured to provide an output indicative of said received electromagnetic radiation to be detected;
    providing said optical signal having a first wavelength as an input optical signal;
    illuminating said detector of electromagnetic radiation with electromagnetic radiation of interest to be detected;
    detecting an output optical signal from said output port of said waveguide with said optical signal detector configured to detect optical signals having said first wavelength; and
    observing said output of said optical signal detector to receive an output indicative of said electromagnetic radiation to be detected.

12. The method of detecting electromagnetic radiation of claim 11, wherein said detector or electromagnetic radiation further comprises a cladding comprising a material that exhibits a nonlinear optical coefficient.

13. The method of detecting electromagnetic radiation of claim 12, wherein said cladding comprising a material that exhibits a nonlinear optical coefficient is a material exhibiting a $\chi^2$ coefficient.

14. The method of detecting electromagnetic radiation of claim 13, wherein said detector of electromagnetic radiation further comprises electrodes for poling said material exhibiting a $\chi^2$ coefficient.

15. The method of detecting electromagnetic radiation of claim 11, wherein said cladding comprising a material that exhibits a nonlinear optical coefficient is a material exhibiting a $\chi^3$ coefficient.

16. The method of detecting electromagnetic radiation of claim 11, wherein said detector of electromagnetic radiation further comprises a grating coupler for coupling said electromagnetic radiation to be detected to said high index contrast waveguide.

17. The method of detecting electromagnetic radiation of claim 11, wherein said waveguide is a slot waveguide.

18. The method of detecting electromagnetic radiation of claim 11, wherein said electromagnetic radiation to be detected comprises a selected one of RF, mm wave, infrared and optical radiation.

19. The method of detecting electromagnetic radiation of claim 11, wherein said output indicative of said received electromagnetic radiation to be detected comprises a selected one of a detection of a presence, a detection of an intensity, and a detection of a frequency of said received electromagnetic radiation to be detected.

* * * * *